US012795703B2

(12) United States Patent
He et al.

(10) Patent No.: US 12,795,703 B2
(45) Date of Patent: Nov. 10, 2026

(54) COLLABORATIVE INFORMATION SENDING METHOD, RESOURCE DETERMINATION METHOD, COMMUNICATION NODE, AND STORAGE MEDIUM

(71) Applicant: ZTE CORPORATION, Shenzhen (CN)

(72) Inventors: Haigang He, Shenzhen (CN); Youxiong Lu, Shenzhen (CN); Jin Yang, Shenzhen (CN); Weimin Xing, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 657 days.

(21) Appl. No.: 18/261,521

(22) PCT Filed: Jan. 11, 2022

(86) PCT No.: PCT/CN2022/071247
§ 371 (c)(1),
(2) Date: Jul. 14, 2023

(87) PCT Pub. No.: WO2022/152108
PCT Pub. Date: Jul. 21, 2022

(65) Prior Publication Data

US 2024/0080870 A1 Mar. 7, 2024

(30) Foreign Application Priority Data

Jan. 15, 2021 (CN) ......................... 202110055419.7

(51) Int. Cl.
*H04W 72/51* (2023.01)
*H04W 64/00* (2009.01)
(Continued)

(52) U.S. Cl.
CPC ......... *H04W 72/51* (2023.01); *H04W 64/006* (2013.01); *H04W 72/25* (2023.01); *H04W 76/20* (2018.02)

(58) Field of Classification Search
CPC ..... H04W 72/51; H04W 76/20; H04W 72/25; H04W 64/006
See application file for complete search history.

(56) References Cited

U.S. PATENT DOCUMENTS 12,420,431 B2 * 9/2025 Cristache ................. B25J 13/06
2017/0034731 A1 * 2/2017 Lee ....................... H04W 24/10
(Continued)

FOREIGN PATENT DOCUMENTS

CN 102946264 A 2/2013
CN 110958586 A 4/2020
(Continued)

OTHER PUBLICATIONS

International Search Report in Application No. PCT/CN2022/071247, dated Apr. 6, 2022, 4 pages, including translation.
(Continued)

*Primary Examiner* — Ajay Cattungal
(74) *Attorney, Agent, or Firm* — Morgan, Lewis & Bockius LLP

(57) ABSTRACT

Provided are a collaborative information sending method, a resource determination method, a communication node, and a storage medium. The collaborative information sending method includes acquiring condition information and sending collaborative information in the case where a target parameter satisfies the restriction of the condition information. The collaborative information includes a resource set.

17 Claims, 9 Drawing Sheets

(51) Int. Cl.
*H04W 72/25* (2023.01)
*H04W 76/20* (2018.01)

(56) References Cited

U.S. PATENT DOCUMENTS

| | | | | |
|---|---|---|---|---|
| 2017/0180100 | A1* | 6/2017 | Lee | H04L 5/0032 |
| 2018/0279152 | A1* | 9/2018 | Kim | H04B 7/00 |
| 2019/0150147 | A1 | 5/2019 | Lee et al. | |
| 2022/0039080 | A1* | 2/2022 | Khoryaev | H04W 4/025 |
| 2023/0092224 | A1* | 3/2023 | Mohammad Soleymani | H04W 72/56 370/329 |
| 2023/0189292 | A1* | 6/2023 | Ganesan | H04L 5/0037 370/329 |
| 2023/0312092 | A1* | 10/2023 | Shimezawa | B64D 45/00 701/3 |

FOREIGN PATENT DOCUMENTS

| | | | |
|---|---|---|---|
| CN | 111432376 | A | 7/2020 |
| CN | 113115450 | A | 7/2021 |
| WO | WO2020264166 | A1 | 12/2020 |

OTHER PUBLICATIONS

Huawei et al., "Rel-17 work scope on NR sidelink enhancements for 5G V2X and other use case", 3GPP TSG RAN Meeting #84, RP-191011, vol. No. 6 Jun. 2019.

Extended European Search Report in Application No. 22738988.9, dated Oct. 28, 2024, 5 pages.

Zte et al. "Inter-UE coordination in mode 2", 3GPP TSG RAN WG1 #103-e, R1-2008879, e-Meeting, Oct. 26-Nov. 13, 2020.

First Office Action in Application No. 10-2023-7027757, dated Jul. 25, 2025, 11 pages, including translation.

Fujitsu, "Considerations on Inter-UE Coordination for Mode 2 Enhancements", 3GPP TSG RAN WG1 Meeting #103- E, R1-2007788, e-Meeting, Oct. 26-Nov. 13, 2020.

Itl et al., "Inter-UE coordination for mode 2 enhancement", 3GPP TSG RAN WG1 #103-e, R1-2008892,. e-Meeting, Oct. 26-Nov. 13, 2020.

First Office Action in Indian Application No. 202327054688, dated Mar. 10, 2026, 7 pages including translation.

Mitsubishi Electric, "Inter-UE coordination for enhanced resource allocation", 3GPP TSG RAN WG1 #103-e, R1-2008861, e-Meeting, Oct. 26-Nov. 13, 2020, 8 pages.

First Office Action in Chinese Application No. 202110055149.7 dated Jun. 27, 2026, 20 pages, including translation.

* cited by examiner

COLLABORATIVE INFORMATION SENDING METHOD, RESOURCE DETERMINATION METHOD, COMMUNICATION NODE, AND STORAGE MEDIUM

CROSS REFERENCE TO RELATED APPLICATIONS

This is a National Stage Application filed under 37 U.S.C. 371 based on International Patent Application No. PCT/CN2022/071247, filed on Jan. 11, 2022, which claims priority to Chinese Patent Application No. 202110055419.7 filed on Jan. 15, 2021, disclosures of which are incorporated herein by reference in their entireties.

TECHNICAL FIELD

The present application relates to the field of wireless communication networks, for example, a collaborative information sending method, a resource determination method, a communication node, and a storage medium.

BACKGROUND

In the sidelink communication system, service between user equipments (UEs) may be directly transmitted from a data source UE to a target UE through sidelink without passing through a network side, that is, without being forwarded by cellular links between the UEs and a base station. The sidelink communication not only saves wireless spectrum resources but also reduces data transmission pressure of a core network. Moreover, the sidelink communication reduces system resource occupation, increases spectrum efficiency, and reduces communication delay. In the process of the sidelink communication, a transmitting terminal, by monitoring resource occupation, selects a resource for signaling or data transmission. However, since the transmitting terminal is limited by a geographical location and thus cannot observe interference of corresponding geographic locations of one or more receiving terminals, the resource independently selected by the transmitting terminal may conflict with or cause interference to the resources transmitted by other terminals, which affects the reliability of the sidelink communication.

SUMMARY

The present application provides a collaborative information sending method, a resource determination method, a communication node, and a storage medium to improve the reliability of the sidelink communication.

Embodiments of the present application provide a collaborative information sending method. The method is applied to a first terminal and includes acquiring condition information and sending collaborative information in the case where a target parameter satisfies the restriction of the condition information. The collaborative information includes a resource set.

Embodiments of the present application also provide a resource determination method. The method is applied to a second terminal and includes receiving collaborative information sent by a first terminal in the case where a target parameter satisfies the restriction of condition information, where the collaborative information includes a resource set; and determining, according to the collaborative information, a resource.

Embodiments of the present application also provide a communication node. The communication node includes a memory, a processor, and a computer program stored on the memory and running on the processor. When executing the computer program, the processor performs the preceding collaborative information sending method or the resource determination method.

Embodiments of the present application also provide a computer-readable storage medium storing a computer program that, when executed by a processor, performs the preceding collaborative information sending method or the resource determination method.

DETAILED DESCRIPTION

Figure 1:
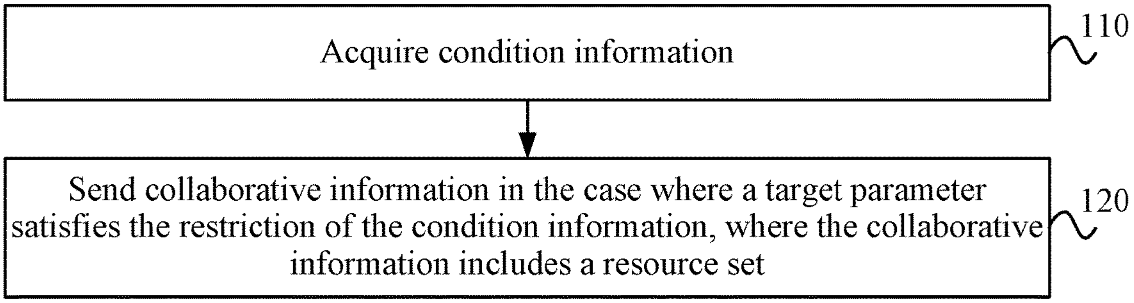
FIG. 1 is a flowchart of a collaborative information sending method according to an embodiment.

The present application is described in conjunction with drawings and embodiments. The specific embodiments described herein are intended to explain the present application. For ease of description, only parts related to the present application are illustrated in the drawings.

The sidelink communication has two resource allocation modes, that is, resources scheduled by a base station and resources independently selected by a terminal. For the mode where resources are independently selected by a terminal, the terminal may monitor the usage of resources in the resource pool range and preferentially select, according to the monitoring result, resources that are not occupied by other terminals in the resource pool or resources with less interference with transmissions of other terminals for signaling or data transmission. The transmitting terminal needs to select a terminal to transmit positioning-related information. The transmitting terminal, due to its geographical location, cannot observe interference of corresponding geographic locations of one or more receiving terminals. Therefore, a collaborative terminal may be found to provide collaborative information for the transmitting terminal and assist the transmitting terminal in selecting resources. However, no perfect solution is provided concerning how to find a suitable collaborative terminal for the transmitting terminal in the case where the transmitting terminal transmits information in a groupcast or broadcast mode.

Embodiments of the present application provide a collaborative information sending method, which can be applied to a first terminal. For a transmitting terminal that adopts a groupcast or broadcast mode, the first terminal may determine whether the first terminal can serve as a collaborative terminal. If the first terminal can serve as a collaborative terminal, the first terminal sends collaborative information and recommends a proper resource set to the transmitting terminal, thereby reducing conflicts or interference between different resources and improving the reliability of the sidelink communication. The method is also applicable to a scenario where the transmitting terminal adopts a unicast communication manner.

FIG. 1 is a flowchart of a collaborative information sending method according to an embodiment. As shown in FIG. 1, the method provided by this embodiment includes 110 and 120.

110: Condition information is acquired.

120: Collaborative information is sent in the case where a target parameter satisfies the restriction of the condition information, where the collaborative information includes a resource set.

In this embodiment, the first terminal receives the condition information indicated by the target terminal, receives the condition information configured by a base station, or acquires pre-stored condition information, as a basis for determining whether the first terminal is a collaborative UE. For example, the target terminal sends sidelink control information (SCI) to the first terminal, and the first terminal may therefore determine whether the target parameter between the first terminal and the target terminal satisfies the restriction of the condition information. If the target parameter between the first terminal and the target terminal satisfies the restriction of the condition information, the first terminal determines that the first terminal is a collaborative UE and sends the collaborative information to the target terminal or another terminal to recommend a resource.

The target terminal in this embodiment may be a collaborative UE or a non-collaborative UE. Multiple target terminals may be provided. The first terminal determines, according to a target parameter of each target terminal, comprehensively whether the first terminal is a collaborative UE.

In this embodiment, the first terminal determines, according to the target parameter and condition information, whether the first terminal can serve as a collaborative UE. The collaborative information is fed back to the target terminal mainly in two modes. (1) The first terminal determines, according to the information sent by the target terminal, the target parameter, for example, the distance between the first terminal and the target terminal, Reference Signal Received Power (RSRP) of a reference signal of the target terminal received by the first terminal, an included angle between the movement direction of the first terminal and the movement direction of the target terminal, and/or the road direction indicated by the target terminal to the first terminal. Then the first terminal compares the target parameter with the condition information and determines that the first terminal is a collaborative UE if the target parameter satisfies the restriction of the condition information. (2) The target terminal determines which UEs can serve as collaborative UEs and notifies the first terminal by sending information to the first terminal. The first terminal determines, according to the information sent by the target terminal, whether the first terminal is one of the collaborative UEs and determines that the first terminal is a collaborative UE if the first terminal belongs to the collaborative UEs. In this case, the target terminal is also called a second terminal.

In this embodiment, the collaborative information includes a resource set. The resource set may be formed by resources recommended by the first terminal, by available resources, or by resources that are not recommended.

In an embodiment, the condition information is pre-configured or pre-stored information, information configured through RRC signaling, or information determined according to the first SCI sent by a second terminal.

In this embodiment, the second terminal refers to a UE that indicates the target parameter and/or condition information to the first terminal. The second terminal and the target terminal may be the same or different.

In an embodiment, the condition information includes at least one of the road direction indicated by a target terminal to the first terminal; the range of the road direction indicated by a target terminal to the first terminal; a road identifier indicated by a target terminal to the first terminal; the movement direction indicated by a target terminal to the first terminal; the range of the movement direction indicated by a target terminal to the first terminal; the threshold of an included angle between the movement direction of the first terminal and the movement direction of a target terminal; the value range of an included angle between the movement direction of the first terminal and the movement direction of a target terminal; the threshold of a remainder obtained from dividing an included angle between the movement direction of the first terminal and the movement direction of a target terminal by 90 or $\pi/2$; the value range of a remainder obtained from dividing an included angle between the movement direction of the first terminal and the movement direction of a target terminal by 90 or $\pi/2$; the threshold of an included angle between the road direction in which the first terminal is located and the road direction in which a target terminal is located; the value range of an included angle between the road direction in which the first terminal is located and the road direction in which a target terminal is located; the threshold of a remainder obtained from dividing an included angle between the road direction in which the first terminal is located and the road direction in which a target terminal is located by 90 or $\pi/2$; the value range of a remainder obtained from dividing an included angle between the road direction in which the first terminal is located and the road direction in which a target terminal is located by 90 or $\pi/2$; the threshold of the distance between the first terminal and a target terminal; the value range of the distance between the first terminal and a target terminal; the threshold of RSRP; the value range of RSRP; or the number threshold of collaborative UEs.

This embodiment mainly focuses on the preceding mode (1). The first terminal determines, according to the information sent by the target terminal, the target parameter. Target parameters include the road direction in which the first terminal is located; a road identifier in which the first terminal is located; the movement direction of the first terminal; the distance between the first terminal and the target terminal; RSRP of a reference signal of the target terminal received by the first terminal; an included angle between the movement direction of the first terminal and the movement direction of the target terminal; a remainder of an included angle between the movement direction of the first terminal and the movement direction of the target terminal; an included angle between the road direction of the first terminal and the road direction of the target terminal and/or a remainder of an included angle between the road direction of the first terminal and the road direction of the target terminal. Correspondingly, the condition information includes value ranges and/or thresholds of these target parameters. A threshold may be an upper limit value, a lower limit value, and/or a grade division value. On this basis, the first terminal compares the target parameter with the condition information and determines that the first terminal is a collaborative UE if the target parameter satisfies the restriction of the condition information.

In an embodiment, the condition information includes the first SCI sent by a second terminal, and the first SCI includes request information that includes at least one of a user identifier of a collaborative UE or a first bitmap. The first bitmap is configured to indicate a collaborative UE or request the first terminal to send the collaborative information.

This embodiment mainly focuses on the preceding mode (2). The first terminal determines, according to the first SCI sent by the second terminal, user identifiers of collaborative UEs and/or collaborative UEs indicated in the bitmap and determines whether the first terminal belongs to one of the collaborative UEs.

In an embodiment, the condition information includes the first SCI sent by a second terminal, and the first SCI includes request information including a user identifier of a collaborative UE, and the user identifier of the collaborative UE is a source identifier (ID) of the collaborative UE.

In this embodiment, the first terminal determines, according to the first SCI sent by the target terminal, a user identifier of a collaborative UE, and the user identifier refers to a source identifier of the collaborative UE.

In an embodiment, the target parameter includes at least one of the road direction in which the first terminal is located; a road identifier in which the first terminal is located; the movement direction of the first terminal; the distance between the first terminal and the target terminal; RSRP of a reference signal of the target terminal received by the first terminal; an included angle between the road direction in which the first terminal is located and the road direction in which the target terminal is located; a remainder obtained from dividing an included angle between the road direction in which the first terminal is located and the road direction in which the target terminal is located by 90 or $\pi/2$; an included angle between the movement direction of the first terminal and the movement direction of the target terminal; or a remainder obtained from dividing an included angle between the movement direction of the first terminal and the movement direction of the target terminal by 90 or $\pi/2$.

In this embodiment, the first terminal may determine, according to the information sent by the target terminal, the following parameters of the road direction indicated by the target terminal to the first terminal; a road identifier indicated by the target terminal to the first terminal; the movement direction indicated by the target terminal to the first terminal; the distance between the first terminal and the target terminal; RSRP of a reference signal of the target terminal received by the first terminal; an included angle between the road direction in which the first terminal is located and the road direction in which the target terminal is located; a remainder obtained from dividing an included angle between the road direction in which the first terminal is located and the road direction in which the target terminal is located by 90 or $\pi/2$; an included angle between the movement direction of the first terminal and the movement direction of the target terminal; a remainder obtained from dividing an included angle between the movement direction of the first terminal and the movement direction of the target terminal by 90 or $\pi/2$; and a user identifier of a collaborative terminal.

For example, the first terminal may determine, by receiving the first SCI sent by the target terminal, a road identifier, the road direction, and/or the movement direction indicated by the target terminal to the first terminal. If the road identifier, the road direction, and/or the movement direction indicated by the target terminal to the first terminal are/is consistent with the road identifier, the road direction, and/or the movement direction where the first terminal is located, the first terminal can determine that the first terminal is a collaborative UE.

For example, the first terminal may determine the distance between the first terminal and the target terminal by receiving a first positioning reference signal (or a first positioning reference signal and the first location information) sent by the target terminal.

For example, the first terminal may determine RSRP of a received reference signal of the target terminal by measuring a reference signal (such as a first positioning reference signal or a demodulation reference signal) sent by the target terminal.

For example, the first terminal may determine, by receiving the first SCI sent by the target terminal, an included angle between the movement direction of the first terminal and the movement direction of the target terminal and/or an included angle between the road direction of the first terminal and the road direction of the target terminal.

For example, the target terminal determines which UEs can serve as collaborative UEs and sends user identifiers of these UEs to the first terminal through the first SCI. The first terminal, after receiving the first SCI, determines whether the first terminal's user identifier belongs to the user identifiers indicated in the first SCI and thus determines whether the first terminal is a collaborative UE. In this case, the first SCI sent by the target terminal may be used to request a receiving terminal UE serving as a collaborative UE to send positioning-related information to the target terminal. This type of target terminal is also referred to as a second terminal. After determining that the first terminal is a collaborative UE, the first terminal may send collaborative information to the second terminal.

In an embodiment, the target parameter includes at least one of the user identifier of the first terminal or the corresponding location of the first terminal in a bitmap.

In this embodiment, if the target parameter is the user identifier of the first terminal, the corresponding condition information is the user identifier of a collaborative UE. If the target parameter is the corresponding location of the first terminal in a bitmap, the corresponding condition information is a bitmap used to indicate a collaborative UE or request to feed back the collaborative information.

In an embodiment, 112 is also included.

112: According to the first SCI sent by a second terminal, the movement direction of the second terminal is determined.

In this embodiment, the second terminal is a target terminal of the first terminal. The first terminal may determine, according to the first SCI sent by the second terminal, the movement direction of the second terminal and may determine an included angle between the movement direction of the first terminal and the movement direction of the target terminal and/or a remainder obtained from dividing the included angle by 90 or π/2. If these target parameters are consistent with the restriction of the condition information, the first terminal sends the collaborative information to the second terminal.

In an embodiment, 114 is also included.

114: According to the first SCI sent by a second terminal, the road direction of the second terminal is determined.

In this embodiment, the second terminal is a target terminal of the first terminal. The first terminal may determine, according to the first SCI sent by the second terminal, the road direction of the second terminal and may determine an included angle between the road direction in which the first terminal is located and the road direction in which the target terminal is located and/or a remainder obtained from dividing the included angle by 90 or π/2. If these target parameters are consistent with the restriction of the condition information, the first terminal sends the collaborative information to the second terminal.

In an embodiment, 116 is also included.

116: According to the zone identifier in the first SCI sent by a second terminal and the zone identifier of the first terminal, the distance between the first terminal and the second terminal is determined.

In this embodiment, the second terminal is a target terminal of the first terminal. The first terminal may determine, according to the first SCI sent by the second terminal, the zone identifier of the second terminal and then may determine, according to the zone identifier of the first terminal and the zone identifier of the second terminal, the distance between the first terminal and the second terminal.

In an embodiment, 120 includes sending the collaborative information in the case where the number of collaborative UEs is less than the number threshold of the collaborative UEs.

In this embodiment, if the number of collaborative UEs in the target terminal reaches the number threshold, the first terminal does not send the collaborative information; if the number of collaborative UEs is less than the number threshold, the first terminal may serve as a collaborative UE and send the collaborative information.

In an embodiment, 120 includes sending the collaborative information in the case where the user identifier of the first terminal belongs to the user identifier of a collaborative UE.

In an embodiment, 120 includes sending the collaborative information in the case where bit indication of the corresponding location of the first terminal in a bitmap is a set value.

For example, if the bit of the corresponding location of the first terminal in the bitmap indicates 1, the first terminal can serve as a collaborative UE and send the collaborative information; if the bit indicates 0, the first terminal does not send the collaborative information.

In an embodiment, 100 is also included.

100: The second SCI is sent, which is configured to indicate that the first terminal supports for being a collaborative terminal.

In this embodiment, the first terminal sends the second SCI to notify other UEs that the first terminal can be a collaborative terminal. For example, the second SCI includes a collaborative UE declaration, indicating that the first terminal can recommend resources or allows other UEs to request the first terminal to feed back the collaborative information.

In an embodiment, 102 is also included.

102: The second SCI is sent, which is configured to indicate a time limit for the first terminal to serve as a collaborative terminal.

In this embodiment, the first terminal, by sending the second SCI, may notify other UEs that the first terminal is willing to or can be a collaborative UE and indicates a time limit for the first terminal to serve as a collaborative terminal.

In an embodiment, 130 is also included.

130: The third SCI is detected.

140: According to the detection result of the third SCI, the collaborative information is sent, or sending the collaborative information is canceled.

In this embodiment, the first terminal, serving as a candidate collaborative terminal, selects a time-frequency resource for sending a second positioning reference signal.

The first terminal detects a third positioning reference signal sent by a non-first terminal (including the target terminal and/or the second terminal), and if the detection result satisfies the second restriction condition, the first terminal, serving as a collaborative UE, sends the second positioning reference signal; otherwise, the first terminal is not a collaborative UE and cancels sending the second positioning reference signal.

In an embodiment, the collaborative information includes a second bitmap, and each bit in the second bitmap is configured to indicate that one sub-channel on one slot is a recommended resource or an un-recommended resource.

In this embodiment, the collaborative information recommends resources via the second bitmap, and each bit in the second bitmap has a fixed mapping relationship with sub-channels on a slot.

The sending process of the collaborative information is described below with specific embodiments.

In this embodiment, the first terminal compares the target parameter and the condition information to determine whether to send the collaborative information to the target terminal (which is the second terminal) or other terminals, so as to recommend a resource set.

Figure 2:
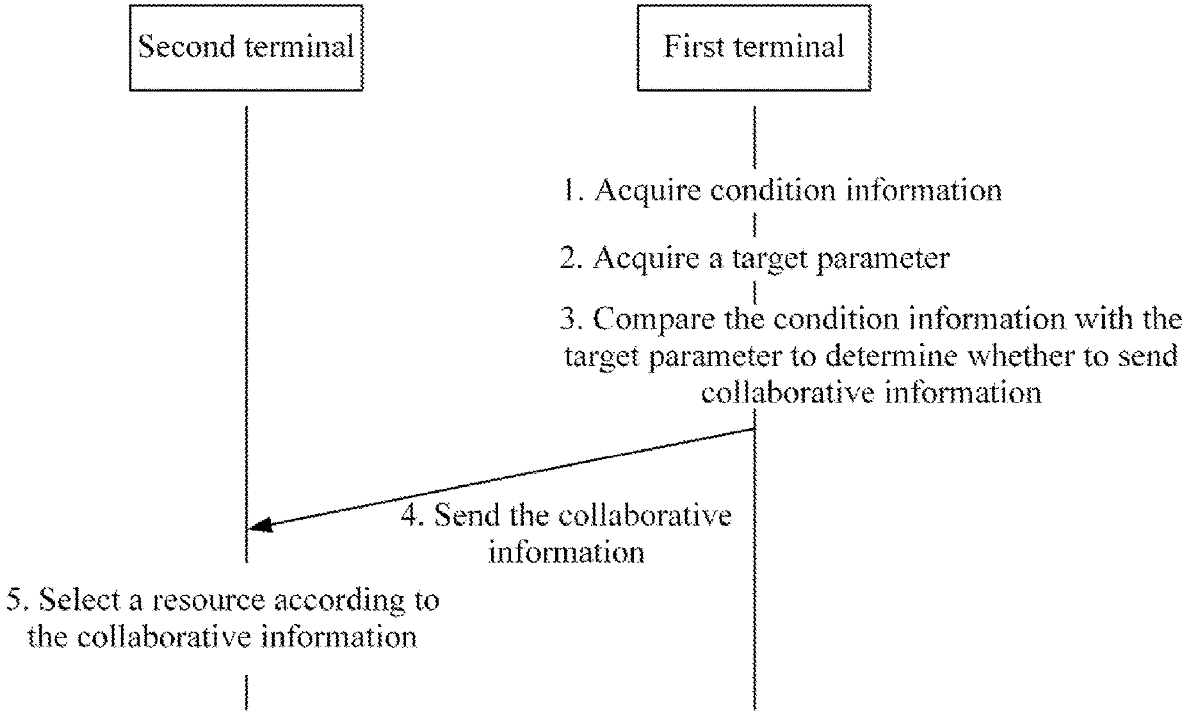
FIG. 2 is a diagram illustrating the sending process of collaborative information according to an embodiment.

FIG. 2 is a diagram illustrating the sending process of collaborative information according to an embodiment. As shown in FIG. 2, the process mainly includes 1 to 5.

1. The first terminal acquires condition information. The condition information includes at least one of the road direction indicated by a target terminal to the first terminal; the range of the road direction indicated by a target terminal to the first terminal; a road identifier indicated by a target terminal to the first terminal; the movement direction indicated by a target terminal to the first terminal; the range of the movement direction indicated by a target terminal to the first terminal; the threshold of an included angle between the movement direction of the first terminal and the movement direction of a target terminal; the value range of an included angle between the movement direction of the first terminal and the movement direction of a target terminal; the threshold of a remainder obtained from dividing an included angle between the movement direction of the first terminal and the movement direction of a target terminal by 90 or π/2; the value range of a remainder obtained from dividing an included angle between the movement direction of the first terminal and the movement direction of a target terminal by 90 or π/2; the threshold of an included angle between the road direction in which the first terminal is located and the road direction in which a target terminal is located;

the value range of an included angle between the road direction in which the first terminal is located and the road direction in which a target terminal is located; the threshold of a remainder obtained from dividing an included angle between the road direction in which the first terminal is located and the road direction in which a target terminal is located by 90 or $\pi/2$; the value range of a remainder obtained from dividing an included angle between the road direction in which the first terminal is located and the road direction in which a target terminal is located by 90 or $\pi/2$; the threshold of the distance between the first terminal and a target terminal; the value range of the distance between the first terminal and a target terminal; the threshold of RSRP; the value range of RSRP; or the number threshold of collaborative UEs.

The first terminal acquires the condition information in the following three modes:

Mode 1: The second terminal sends the first SCI to the first terminal to indicate the condition information. The first terminal acquires, by receiving the first SCI of the second terminal, the condition information.

Mode 2: The base station configures, through Radio Resource Control (RRC) signaling, the condition information for the first terminal. The first terminal, by receiving the RRC signaling, acquires the condition information. Alternatively, the first terminal pre-stores the condition information configured in the received RRC signaling, and the stored condition information, through higher-layer RRC pre-configuration signaling of the first terminal, is notified to the physical layer of the first terminal. Alternatively, the condition information may be stored in the first terminal in a factory pre-configuration manner, and the stored condition information, through higher-layer RRC pre-configuration signaling of the first terminal, is notified to the physical layer of the first terminal.

Mode 3: The second terminal sends, through the first SCI, request information for collaborative information to the first terminal. The request information includes a user identifier (for example, a source identifier, (source ID)) of a collaborative UE or a first bitmap used to indicate a collaborative UE or request collaborative information. Each bit in the first bitmap has a fixed mapping relationship with the UE number in a UE set. For example, the ith bit from low to high in the first bitmap is used to indicate whether the UE numbered i in the UE set needs to feed back the collaborative information to the second terminal. The UE corresponding to the bit whose bit value is 1 is a collaborative UE. The second terminal triggers these collaborative UEs to feed back the collaborative information. The first terminal may determine whether to feed back the collaborative information to the second terminal according to whether the first terminal's source ID belongs to the user identifier of a collaborative UE or according to the bit value of the first terminal's number in the corresponding location in the first bitmap.

For mode 3, before requesting, through the first SCI, a first UE to feed back the collaborative information, the second terminal first needs to select one or more collaborative UEs. The second terminal may select, based on the movement direction, a collaborative UE. For example, a UE whose included angle between the movement direction of the second terminal and the movement direction of the UE is less than the movement-direction included angle threshold is selected as a collaborative UE. The second terminal may also select a collaborative UE based on factors such as the distance, the number of collaborative UEs, and an included angle between road directions.

2. The first terminal acquires a target parameter in the following two modes:

Mode a: The first terminal receives the SCI of the target terminal (which may include a second terminal) to acquire the target parameter, and/or the first terminal acquires, via the first terminal's sensor device, the target parameter. The target parameter includes at least one of the road direction in which the first terminal is located; a road identifier in which the first terminal is located; the movement direction of the first terminal; an included angle between the movement direction of the first terminal and the movement direction of the target terminal; a remainder obtained from dividing an included angle between the movement direction of the first terminal and the movement direction of the target terminal by 90; a remainder obtained from dividing an included angle between the movement direction of the first terminal and the movement direction of the target terminal by $\pi/2$; an included angle between the road direction in which the first terminal is located and the road direction in which the target terminal is located; a remainder obtained from dividing an included angle between the road direction in which the first terminal is located and the road direction in which the target terminal is located by 90; a remainder obtained from dividing an included angle between the road direction in which the first terminal is located and the road direction in which the target terminal is located by $\pi/2$; the distance between the first terminal and the target terminal; or RSRP of a reference signal of the target terminal received by the first terminal.

For example, the first terminal calculates, according to the target terminal's movement direction indicated by the target terminal's SCI and the first terminal's movement direction, an included angle between the movement direction of the first terminal and the movement direction of the target terminal.

For example, the first terminal acquires the zone identifier of the target terminal indicated by a bit in the SCI of the target terminal and determines, based on the zone identifier of the first terminal and the zone identifier of the target terminal, the distance between the first terminal and the target terminal. The zone identifier is used to represent a rectangular area. The first terminal calculates center location coordinates of a rectangular area corresponding to the zone identifier of the first terminal and center location coordinates of a rectangular area corresponding to the zone identifier of the target terminal, and calculates, based on the two center location coordinates, the distance between the first terminal and the target terminal.

Mode b: The target parameter includes at least one of the user identifier of the first terminal or the corresponding bit location of the first terminal in a bitmap.

In this case, the second terminal sends the request information to the first terminal using a specific SCI format. For example, the second terminal indicates, via a bit in the first SCI, user identifiers of one or more collaborative UEs to the first terminal. Alternatively, the second terminal indicates, via bits in the first SCI, the first bitmap to the first terminal. Each bit in the first bitmap has a fixed mapping relationship with the UE number in a UE set. The first terminal may determine whether to feed back the collaborative information to the second terminal according to whether the first terminal's source ID belongs to the user identifier of a collaborative UE or according to the bit value of the first terminal's number in the corresponding location in the first bitmap.

3. The first terminal compares the condition information with the target parameter to determine whether to send the collaborative information.

For example, the condition information includes the threshold of an included angle between movement directions and the distance threshold. A threshold may be an upper limit value, a lower limit value, and/or a grade division value. The threshold of an included angle between movement directions is 15 degrees. The distance threshold is 300 meters. The target parameters include a remainder obtained from dividing an included angle between the movement direction of the first terminal and the movement direction of the target terminal by 90, that is, mod (π/2, 90) alpha, and the distance between the first terminal and the target terminal. After acquiring the condition information and the target parameters, the first terminal determines, based on a comparison between the condition information and the target parameters, whether to send the collaborative information. For example, if a target UE satisfying the following conditions cannot be found, the first terminal may serve as a collaborative UE to send the collaborative information to the second terminal:

The value of a remainder obtained from dividing an included angle between the first terminal and the target terminal by 90 is less than the angle (included angle) threshold of 15 degrees. The distance between the first terminal and the target terminal is less than the distance threshold of 300 meters. The target terminal serves as a collaborative UE that sends the collaborative information.

For example, the target parameter is the road direction in which the first terminal is located, and the restriction condition is the road direction indicated by the target terminal to the first terminal. If the road direction in which the first terminal is located is the same as the road direction indicated by the target terminal to the first terminal, the first terminal determines that the restriction condition is satisfied and sends the collaborative information.

For example, the target parameter is the road direction in which the first terminal is located, and the restriction condition is the range of the road direction indicated by the target terminal to the first terminal. If the road direction in which the first terminal is located does not exceed the range of the road direction indicated by the target terminal to the first terminal, the first terminal determines that the restriction condition is satisfied and sends the collaborative information.

4. If the target parameter satisfies the restriction of the condition information, the first terminal may serve as a collaborative UE of the second terminal and send collaborative information to the second terminal, indicating a resource set recommended to the second terminal or a resource set that is not recommended to be used by the second terminal.

5. The second terminal receives the collaborative information sent by the first terminal, acquires a resource set that is recommended or not recommended by the second terminal, and based on this, flexibly selects a resource for signaling or information transmission or selects a resource for both signaling and information transmission.

Example 1 (The first terminal compares the received RSRP of a reference signal of the target terminal and the number of collaborative UEs with the condition information to determine whether to send the collaborative information.)

As shown in FIG. 2, the process of sending the collaborative information includes 1 to 5.

1. Condition information is acquired, which includes receiving, by the first terminal, the threshold of the RSRP of a reference signal of the target terminal, for example, −100 dBm, and the threshold number of collaborative UEs.

The first terminal acquires, by receiving RRC signaling or pre-configuration signaling of the base station, the condition information. Acquiring the condition information through the pre-configuration signaling may be acquiring the condition information in a factory pre-configuration manner, or pre-storing, by the first terminal, the condition information configured by RRC signaling from the base station.

2. The first terminal acquires, by receiving the SCI of the target terminal, a target parameter. The target parameter includes the RSRP of a reference signal of the target terminal received by the first terminal.

The RSRP of the reference signal of the target terminal received by the first terminal is obtained by measuring a physical sidelink control channel (PSCCH) demodulation reference signal (DMRS) that successfully decodes the SCI of the target terminal or a physical sidelink shared channel (PSSCH).

3. For each target terminal (the target terminal is a collaborative UE that supports sending of the collaborative information), the first terminal compares the target parameter and the condition information to determine whether to send the collaborative information.

If the number of collaborative UEs satisfying the following condition is less than the number threshold (for example, 3), the first terminal can serve as a collaborative UE to send the collaborative information: The RSRP of a reference signal received by the first terminal from the target terminal is less than −100 dBm.

Figure 3:
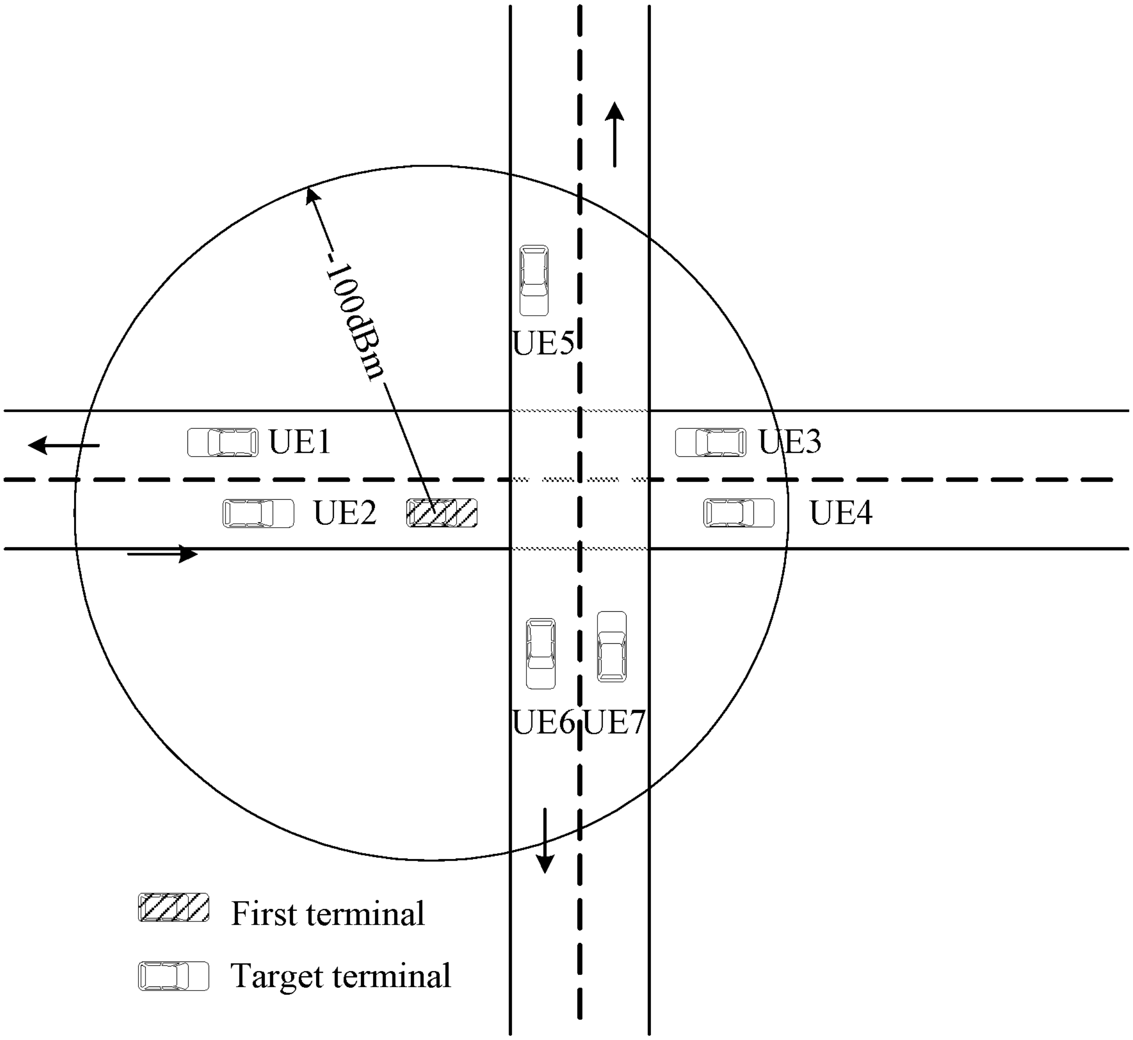
FIG. 3 is a diagram in which the number of collaborative UEs is determined according to an embodiment.

FIG. 3 is a diagram in which the number of collaborative UEs is determined according to an embodiment. As shown in FIG. 3, the first terminal receives the SCI of the target terminal and finds a target terminal including UE1 to UE6 under two conditions that the SCI is successfully received and that the RSRP of the reference signal of the target terminal received by the first terminal does not exceed −100 dBm.

For example, the first terminal, by receiving the SCI of UE1 to UE6, finds that the SCI format corresponding to UE1 and UE2 is SCI format 2-C that is used to decode the PSSCH carrying the collaborative information and that the SCI format corresponding to UE3 to UE6 is SCI format 2-A that is used to decode the PSSCH carrying normal data information. That is, in UE1 to UE6, the first terminal, by SCI decoding, finds that the collaborative UEs that send the collaborative information include UE1 and UE2 and that UEs that send non-collaborative information are UE3 to UE6. In this case, the number of collaborative UEs satisfying conditions that SCI decoding succeeds and that the RSRP is less than −100 dBm is 2, which is less than the number threshold 3 of collaborative UEs. Therefore, the first terminal may serve as a collaborative UE to send the collaborative information to the target terminal (the target terminal is a second terminal) or another terminal.

4. The first terminal serves as a collaborative UE and sends the collaborative information to the second terminal.

The collaborative information sent by the first terminal may be a second bitmap. Each bit in the second bitmap is configured to indicate whether one sub-channel on one slot is a recommended resource for use (also referred to as a recommended resource) or an available resource. A bit in the second bitmap has a corresponding relationship with a resource location.

Figure 4:
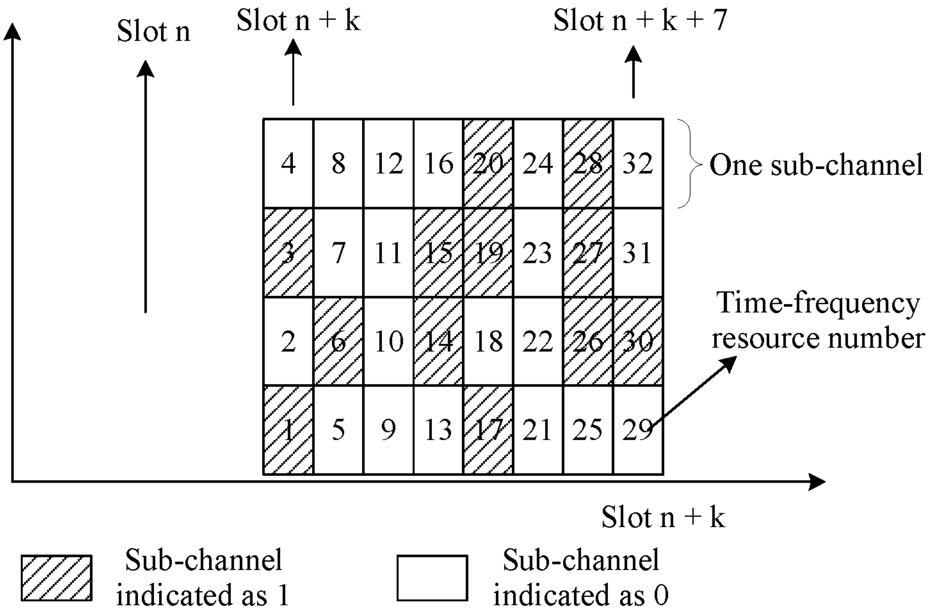
FIG. 4 is a diagram illustrating time-frequency resource numbers according to an embodiment.

FIG. 4 is a diagram illustrating time-frequency resource numbers according to an embodiment. As shown in FIG. 4, the first terminal sends a 32-bit bitmap on slot n and indicates a time window [n+k, n+k+7] for resource selection. The first terminal indicates the time window [n+k, n+k+7] for resource selection in the following mode: On slot n, the offset value is indicated as k, and the length of the indicated time window is 8. Each sub-channel on each slot in the time window [n+k, n+k+7] is numbered in an ascending manner according to the sequence of first frequency domain and then time domain. Numbers of each sub-channel of each slot are shown in FIG. 4.

The corresponding relationship between the bit in the second bitmap and the resource location is as follows: The ith bit in the second bitmap from low to high is used to indicate whether the ith resource is a recommended resource for use or an available resource. The ith bit indicates 1, meaning that the first terminal indicates that the ith resource is a recommended resource or an available resource. The process where the first terminal determines that the ith resource indicates 1 includes the following procedure: The first terminal determines a resource set based on the received SCI of the target terminal and the measurement result of the RSRP of the reference signal of the target terminal. For a resource in the resource set, the first terminal, by the bitmap, indicates that the bit value corresponding to the resource is 1.

As shown in FIG. 4, the time window for resource selection is [n+k, n+k+7], one sub-channel corresponds to one time-frequency resource, and the time window [n+k, n+k+7] includes 32 resources. The first terminal excludes, among the 32 resources in the time window, resources indicated by the SCI of the target terminal as being occupied where the RSRP for the target terminal is higher than the RSRP threshold. The remaining resources are a resource set of recommended resources or available resources determined by the first terminal, which is denoted as setA1. The first terminal, in the second bitmap, indicates that the bit value of a recommended resource or an available resource in the setA1 is 1. The RSRP threshold may be configured through the RRC signaling of the base station or through the pre-configuration signaling of the first terminal. The configured or pre-configured RSRP threshold has nothing to do with service priority. The excluded resources may also constitute a resource set of un-recommended or unusable resources, namely, setA0. The first terminal, in the second bitmap, indicates that the bit value of an un-recommended resource or an unusable resource in the setA0 is 0.

5. The second terminal receives the collaborative information of the first terminal and determines, according to the second bitmap in the collaborative information, a recommended resource or an available resource. The second terminal selects, based on the second bitmap indicated by the first terminal, a resource set setA2. Resources in setA2 include consecutive N sub-channels. The first terminal indicates, by the second bitmap, that the N resources are recommended resources or available resources (that is, the bit values corresponding to the N resources are 1). In addition, the second terminal may also determine, based on the second bitmap indicated by the first terminal, the setA0 to determine un-recommended or unavailable resources. The number N of the consecutive sub-channels may be acquired by configuration of RRC signaling of the base station or pre-configuration.

Figure 5:
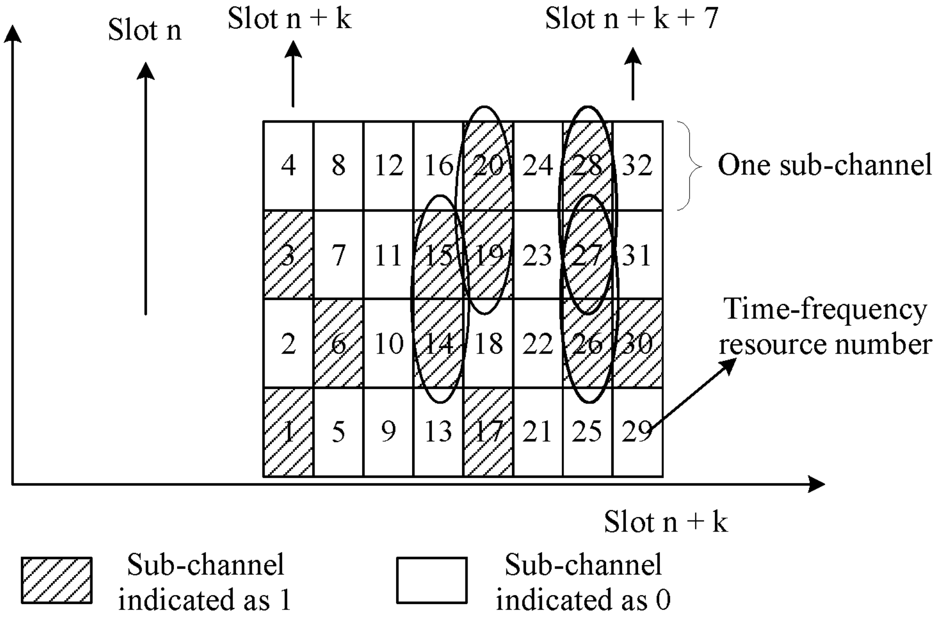
FIG. 5 is a diagram illustrating a resource set according to an embodiment.

FIG. 5 is a diagram illustrating a resource set according to an embodiment. As shown in FIG. 5, for example, N=2, setA2 includes four resources circled by ellipses, and each resource includes N that equals 2 consecutive sub-channels whose bit values are 1 at the corresponding location in the second bitmap.

In addition to acquiring the setA2 by receiving the second bitmap of the first terminal, the second terminal may also acquire a resource set setA3 by receiving the SCI of a non-second terminal and measuring the RSRP (measuring PSCCH DMRS or PSSCH DMRS) of the non-second terminal. The second terminal acquires the setA3 in the following mode: In the set time window, the second terminal excludes resources indicated by the SCI of another non-second terminal as being occupied or for which the RSRP is higher than the RSRP threshold, and the remaining resources are used as the resource set setA3.

The second terminal obtains an intersection of the setA3 and setA2 and then randomly selects a resource from the intersection to transmit signaling or data of the second terminal. If resources contained in the intersection of the setA3 and setA2 are not enough, the second terminal ignores the setA2 and randomly selects a resource from the setA3 to transmit signaling or data of the second terminal.

Example 2 (The first terminal compares the distance between the first terminal and the target terminal, an included angle between the movement directions, and the number of collaborative UEs with the condition information to determine whether to send the collaborative information.)

As shown in FIG. 2, the process of sending the collaborative information mainly includes 1 to 5.

1. Condition information is acquired, which includes the threshold of a remainder obtained from dividing an included angle between the movement direction of the first terminal and the movement direction of the target terminal by $\pi/2$, for example, $\pi/12$ radians and the distance between the first terminal and the target terminal, for example, 300 meters.

The first terminal acquires, by receiving RRC signaling or pre-configuration signaling of the base station, the condition information. Acquiring the condition information through the pre-configuration signaling may be acquiring the condition information in a factory pre-configuration manner, or pre-storing, by the first terminal, the condition information configured by RRC signaling from the base station.

2: The first terminal acquires, by receiving the SCI of the target terminal, a target parameter. The target parameters include a remainder obtained from dividing an included angle $\alpha$ between the movement direction of the first terminal and the movement direction of the target terminal by $\pi/2$, and the distance between the first terminal and the target terminal.

The first terminal calculates, according to the target terminal's movement direction indicated by the target terminal's SCI and the first terminal's movement direction, an included angle $\alpha$ between the movement direction of the first terminal and the movement direction of the target terminal, and acquires the value of a remainder of $\alpha$ divided by 90 or $\pi/2$.

The SCI of the target terminal includes 3-bit information for indicating the movement direction of the target terminal.

For example, Bit 000 is used to indicate that the movement direction is due north.

Bit 001 is used to indicate that the movement direction is 45 degrees north by south.

Bit 010 is used to indicate that the movement direction is due west.

Bit 011 is used to indicate that the movement direction is 45 degrees west by south.

Bit 100 is used to indicate that the movement direction is due south.

Bit 101 is used to indicate that the movement direction is 45 degrees east by south.

Bit 110 is used to indicate that the movement direction is due east.

Bit 111 is used to indicate that the movement direction is 45 degrees north by east.

In addition, the first terminal acquires the zone identifier of the target terminal indicated by the SCI of the target terminal and determines, based on the zone identifier of the first terminal and the zone identifier of the target terminal, the distance between the first terminal and the target terminal. The first terminal may calculate, based on center location coordinates of a rectangular area corresponding to the zone identifier of the first terminal and center location coordinates of a rectangular area corresponding to the zone identifier of the target terminal, the distance between the first terminal and the target terminal.

3. For each target terminal (the target terminal is a collaborative UE that supports sending of the collaborative information), the first terminal compares the target parameter and the condition information to determine whether to send the collaborative information.

If the number of collaborative UEs satisfying the following conditions is less than the number threshold, the first terminal can serve as a collaborative UE to send the collaborative information:

A remainder obtained from dividing an included angle $\alpha$ between the movement direction of the first terminal and the movement direction of the target terminal by $\pi/2$ is less than $\pi/12$ radians. The distance between the first terminal and the target terminal is less than 300 meters.

For example, the number threshold is 1. That is, the first terminal compares the condition information with the target parameter, and if the collaborative UE satisfying the preceding condition is not found (the number of collaborative UEs is 0), the first terminal can serve as a collaborative UE to send the collaborative information; if at least one collaborative UE satisfying the preceding condition exists, the first terminal is not a collaborative UE and does not send the collaborative information.

Figure 6:
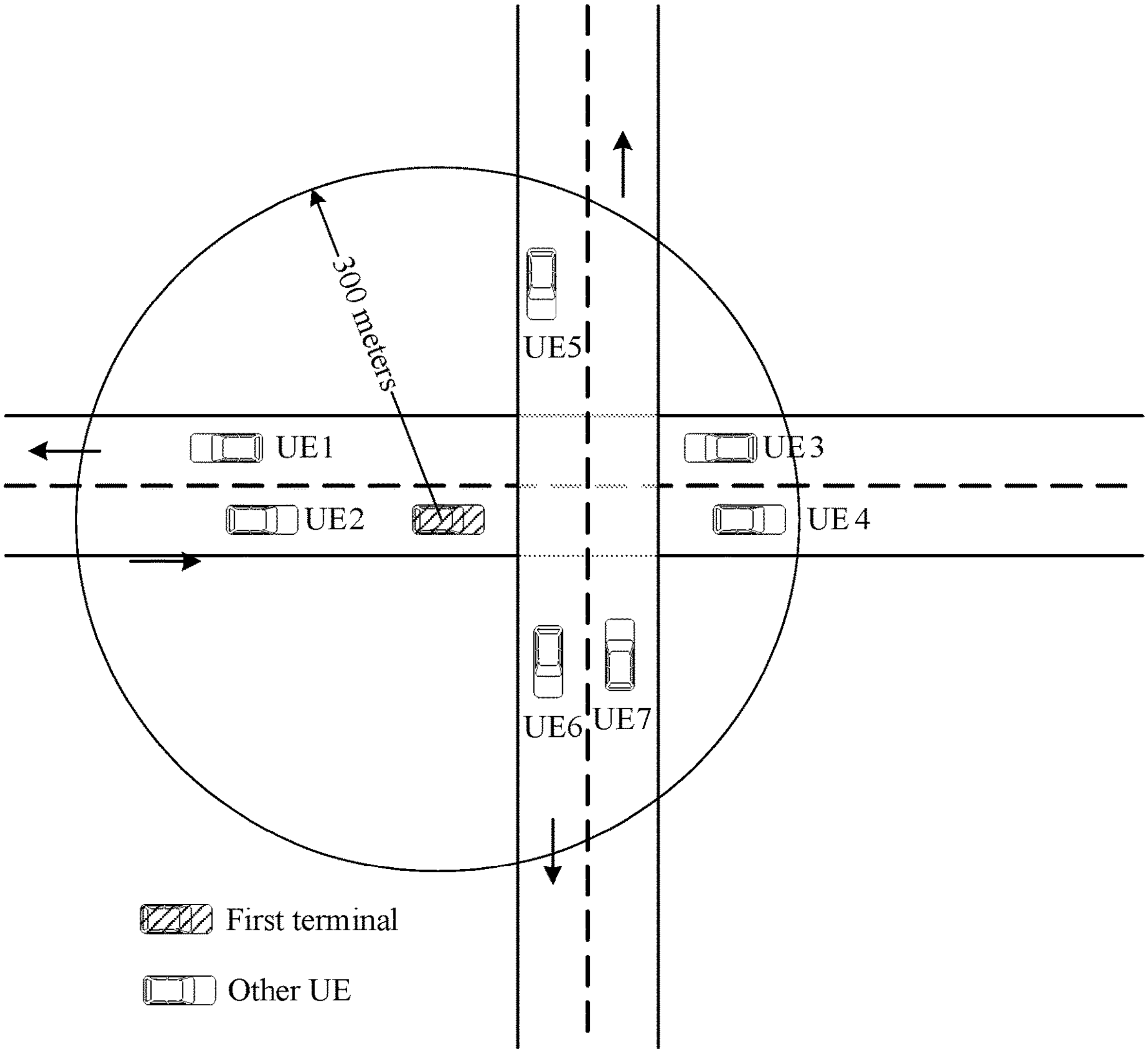
FIG. 6 is a diagram in which the number of collaborative UEs is determined according to another embodiment.

FIG. 6 is a diagram in which the number of collaborative UEs is determined according to another embodiment. As shown in FIG. 6, the first terminal receives the SCI of the target terminal and finds a target terminal including UE1 to UE6 under two conditions that the SCI is successfully received and that the distance between the first terminal and the target terminal is less than 300 meters. The first terminal selects UE1 to UE4 under the condition that a remainder obtained from dividing an included angle between the movement direction of the first terminal and the movement direction of the target terminal by $\pi/2$ is less than $\pi/12$ radians.

For example, the first terminal, by receiving the SCI of UE1 to UE6, finds that the SCI format corresponding to UE1 and UE2 is SCI format 2-C that is used to decode the PSSCH carrying the collaborative information and that the SCI format corresponding to UE3 to UE6 is SCI format 2-A that is used to decode the PSSCH carrying normal data information. That is, in UE1 to UE6, the first terminal, by SCI decoding, finds that the collaborative UEs that send the collaborative information include UE1 and UE2 and that UEs that send non-collaborative information are UE3 to UE6. In this case, the number of collaborative UEs whose SCI decoding succeeds and that satisfy the preceding conditions is 2, which is less than the number threshold 3 of collaborative UEs. Therefore, the first terminal can serve as a collaborative UE to send the collaborative information to the target terminal (the target terminal is a second terminal) or another terminal.

4. The first terminal serves as a collaborative UE and sends the collaborative information to the second terminal.

The collaborative information sent by the first terminal may be a second bitmap. Each bit in the second bitmap is configured to indicate whether one sub-channel on one slot is a recommended resource for use (also referred to as a recommended resource) or an available resource. A bit in the second bitmap has a corresponding relationship with a resource location. The corresponding relationship is as follows: The ith bit in the second bitmap from low to high is used to indicate whether the ith resource is a recommended resource for use or an available resource. The ith bit indicates 1, meaning that the first terminal indicates that the ith resource is a recommended resource or an available resource. The process where the first terminal determines that the ith resource indicates 1 includes the following procedure: The first terminal determines a resource set based on the received SCI of the target terminal and the measurement result of the RSRP of the reference signal of the target terminal. For a resource in the resource set, the first terminal, by the second bitmap, indicates that the bit value corresponding to the resource is 1.

The RSRP threshold may be configured through the RRC signaling of the base station or the pre-configuration signaling of the first terminal. The configured or pre-configured RSRP threshold has nothing to do with service priority.

5. The second terminal receives the collaborative information of the first terminal and determines, according to the second bitmap in the collaborative information, a recommended resource or an available resource. The second terminal determines, based on the second bitmap indicated by the first terminal, a resource set setA2. Resources in setA2 include consecutive N sub-channels. The first terminal indicates, by the second bitmap, that the N resources are recommended resources or available resources (that is, the bit values corresponding to the N resources are 1). The number N of the consecutive sub-channels may be acquired by configuration of RRC signaling of the base station or pre-configuration.

In addition to acquiring the setA2 by receiving the second bitmap of the first terminal, the second terminal may also acquire a resource set setA3 by receiving the SCI of a non-second terminal and measuring the RSRP (measuring PSCCH DMRS or PSSCH DMRS) of the non-second terminal. The second terminal acquires the setA3 in the following mode: In the set time window, the second terminal excludes resources indicated by the SCI of another non-second terminal as being occupied where the RSRP is higher than the RSRP threshold, and the remaining resources are used as the resource set setA3.

The second terminal obtains an intersection of the setA2 and setA3 and then randomly selects a resource from the intersection to transmit signaling and data of the second terminal. If resources contained in the intersection of the setA2 and setA3 are not enough, the second terminal ignores the setA2 and randomly selects a resource from the setA3 to transmit signaling and data of the second terminal.

Example 3 (For groupcast, the second terminal selects a collaborative UE and sends the first SCI to the first terminal, and the first SCI includes request information including a user identifier.)

In this example, the first terminal sends a collaborative UE declaration indicating that the first terminal can or is willing to become a collaborative UE. After receiving the collaborative UE declaration information of one or more terminals, the second terminal selects one or more terminals from the terminals as the first terminal, and after selecting the first terminal, the second terminal sends request information to the first terminal. The request information is used to request the first terminal to send the collaborative information. The first terminal receives the request information of the second terminal and determines whether to send the collaborative information. If it is determined that the collaborative information is to be sent, the first terminal sends the collaborative information.

Figure 7:
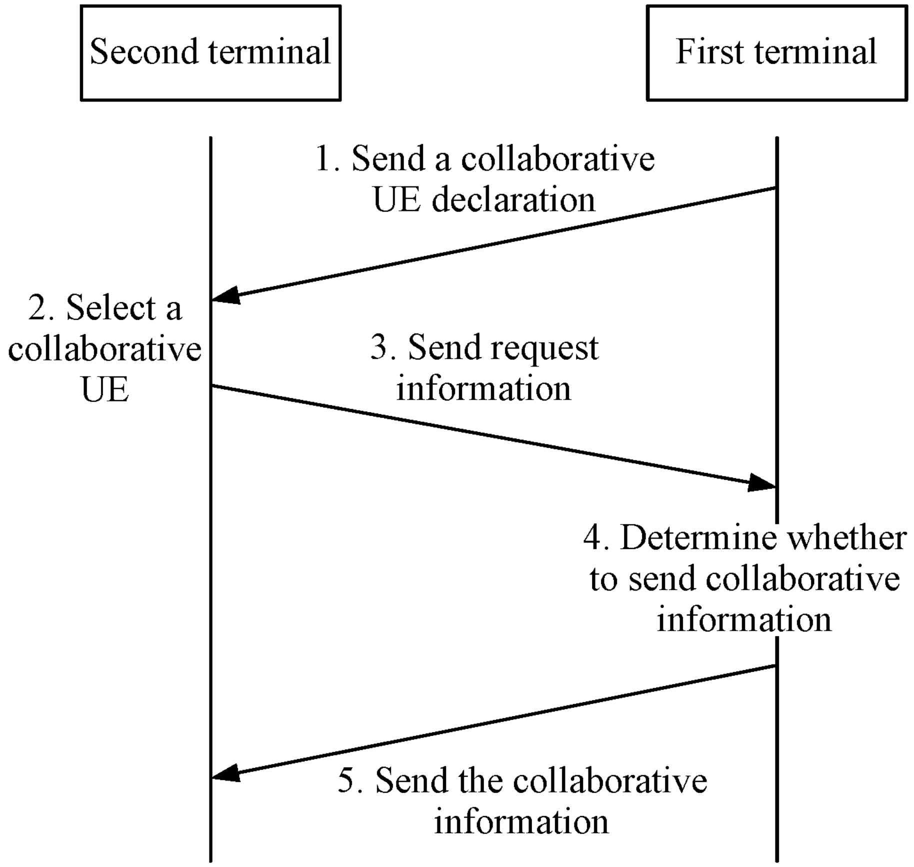
FIG. 7 is a diagram illustrating the sending process of collaborative information according to another embodiment.

FIG. 7 is a diagram illustrating the sending process of collaborative information according to another embodiment. As shown in FIG. 7, the process of sending the collaborative information includes 1 to 5.

1. The first terminal sends a collaborative UE declaration indicating that the first terminal can or is willing to become a collaborative UE.

The collaborative UE declaration is indicated by a bit in the second SCI, and the second SCI is transmitted through the PSCCH or PSSCH. The first terminal may also declare a time limit for the first terminal to serve as a collaborative UE through the second SCI. For example, at time t1, the first terminal notifies the duration L of the first terminal's being a collaborative UE, that is, the start time at which the first terminal can or is willing to become a collaborative UE is t1, and the end time is t1+L−1. During the time period [t1, t1+L−1], the first terminal can serve as a collaborative UE and transmit the collaborative information to another terminal.

2. After receiving the collaborative UE declarations of one or more UEs, the second terminal selects one or more UEs from these UEs as collaborative UEs. In this example, the collaborative UEs selected by the second terminal include the first terminal.

The second terminal determines, by receiving the collaborative UE declarations of one or more UEs, all or a part of the UEs that satisfy the following conditions as collaborative UEs:

The distance between the second terminal and the UE does not exceed the distance threshold. A remainder obtained from dividing an included angle between the movement direction of the second terminal and the movement direction of the UE indicated by the UE's SCI by $\pi/2$ does not exceed the threshold of a remainder obtained from dividing the included angle between the movement directions by $\pi/2$. The SCI of the UE indicates that the UE can or is willing to become a collaborative UE. The second terminal and the UE belong to the same group.

3. The second terminal sends request information to the selected collaborative UE to request the collaborative UE to feed back the collaborative information.

The second terminal may send the request information using a specific SCI format. For example, the second terminal sends the first SCI whose bit indicates a user identifier of the selected collaborative UE. Alternatively, the second terminal sends the first SCI whose bit indicates the first bitmap. The bit location in the first bitmap has a fixed mapping relationship with a collaborative UE in the group where the second terminal is located. That is, each bit in the first bitmap is used to indicate whether one UE in the group where the second terminal is located is selected as a collaborative UE. If the bit value of one bit in the first bitmap is 1, it indicates that the UE corresponding to the bit is a collaborative UE. If the value of one bit in the first bitmap is 0, it indicates that the UE corresponding to the bit does not send the collaborative information.

In addition, the second terminal may also indicate, through the first SCI, the time window for sending the collaborative information to the target terminal.

In addition, the second terminal may also indicate, through the first SCI, a destination identifier (destination ID) to the target terminal. The destination identifier is a group identifier, which is used to distinguish different UE groups.

4. The first terminal receives the request information sent by the second terminal and determines whether to send the collaborative information.

If the first terminal determines that the first SCI of the second terminal is sent to the first terminal, the first terminal may serve as a collaborative UE to send the collaborative information to the second terminal. If the source ID of the first terminal is the same as one of the user identifiers of the collaborative UEs indicated in the first SCI, the first terminal serves as a collaborative UE to send the collaborative information to the second terminal. In this case, the target parameter includes the source ID of the first terminal, and the condition information includes the user identifier of a collaborative UE.

Alternatively, the first terminal determines whether to send the collaborative information according to the fixed mapping relationship between the bit location in the first bitmap and the collaborative UE in the group where the second terminal is located. If the bit value of the corresponding location indicates 1, the first terminal serves as a collaborative UE to send the collaborative information to the second terminal. In this case, the target parameter includes a corresponding location of the first terminal in the bitmap, and the condition information includes the bit value of the corresponding location in the bitmap.

5. The first terminal sends the collaborative information. Sending the collaborative information falls within the time window for sending the collaborative information notified by the second terminal in the first SCI. The collaborative information includes at least one resource set. The at least one resource set may be composed of recommended resources or available resources or may be composed of un-recommended resources.

For example, the first terminal determines the set of recommended resources in the following mode: The first terminal determines, by monitoring the SCI of a non-first terminal, an occupied resource indicated by the non-first terminal and obtains, by measuring the PSCCH DMRS or PSSCH DRMS of the non-first terminal, the corresponding RSRP. The first terminal excludes resources indicated as being occupied by another non-first terminal within the time window of resource selection or indicated as being occupied where corresponding RSRP is greater than the RSRP threshold. The remaining resources are marked as setA1 that is a set of resources recommended by the first terminal.

In this example, the second terminal receives the collaborative information sent by the first terminal, selects a resource based on the collaborative information, and determines, based on the second bitmap indicated by the first terminal, a resource set setA2. In addition, the second terminal acquires, by monitoring the SCI of another non-second terminal, an occupied resource indicated by the non-second terminal. The second terminal acquires, by measuring the PSCCH DMRS or PSSCH DRMS of the non-second terminal, the RSRP between the second terminal and the non-second terminal. The first terminal excludes resources indicated as being occupied by another non-first terminal within the time window of resource selection or indicated as being occupied where corresponding RSRP is greater than the threshold. The remaining resources are marked as setA3. The second terminal obtains an intersection of the setA3 and setA2 and then randomly selects a resource from the intersection to transmit signaling or data. If resources contained in the intersection of the setA2 and setA3 are not enough, the second terminal ignores the setA2 and randomly selects a resource from the setA3.

Example 4 (For broadcast, the second terminal selects a collaborative UE and sends the first SCI to the first terminal, and the first SCI includes request information including a user identifier.)

In this example, the first terminal sends a collaborative UE declaration indicating that the first terminal can or is willing to become a collaborative UE. After receiving the collaborative UE information of one or more terminals, the second terminal selects one or more terminals from the terminals as the first terminal, and after selecting the first terminal, the second terminal sends request information to the first terminal. The request information is used to request the first terminal to send the collaborative information. The first terminal receives the request information of the second terminal and determines whether to send the collaborative information. If it is determined that the collaborative information is to be sent, the first terminal sends the collaborative information.

As shown in FIG. 7, the process of sending the collaborative information mainly includes 1 to 5.

1. The first terminal sends a collaborative UE declaration indicating that the first terminal can or is willing to become a collaborative UE.

The collaborative UE declaration is indicated by a bit in the second SCI, and the second SCI is transmitted through the PSCCH or PSSCH. The first terminal may also declare a time limit for the first terminal to serve as a collaborative UE through the second SCI. For example, at time t1, the first terminal notifies the duration L of the first terminal's being a collaborative UE, that is, the start time at which the first terminal can or is willing to become a collaborative UE is t1, and the end time is t1+L−1. During the time period [t1, t1+L−1], the first terminal can serve as a collaborative UE and transmit the collaborative information to another terminal.

2. After receiving the collaborative UE declarations of one or more UEs, the second terminal selects one or more UEs from these UEs as collaborative UEs. In this example, the collaborative UEs selected by the second terminal include the first terminal.

The second terminal determines, by receiving the collaborative UE declarations of one or more UEs, all or a part of the UEs that satisfy the following conditions as collaborative UEs:

The distance between the second terminal and the UE does not exceed the distance threshold. A remainder obtained from dividing an included angle between the movement direction of the second terminal and the movement direction of the UE indicated by the UE's SCI by $\pi/2$ does not exceed the threshold of a remainder obtained from dividing the included angle between the movement directions by $\pi/2$. The SCI of the UE indicates that the UE can or is willing to become a collaborative UE.

3. The second terminal sends request information to the selected collaborative UE to request the collaborative UE to feed back the collaborative information.

The second terminal may send the request information using a specific SCI format. For example, the second terminal sends the first SCI whose bit indicates a user identifier of the selected collaborative UE.

In addition, the second terminal may also indicate, through the first SCI, the time window for sending the collaborative information to the target terminal.

In addition, the second terminal may also indicate, through the first SCI, a destination identifier to the target terminal. The destination identifier is a group identifier, which is used to distinguish different UE groups.

4. The first terminal receives the request information sent by the second terminal and determines whether to send the collaborative information.

If the first terminal determines that the first SCI of the second terminal is sent to the first terminal, the first terminal may serve as a collaborative UE to send the collaborative information to the second terminal. If the source ID of the first terminal is the same as one of the user identifiers of the collaborative UEs indicated in the first SCI, the first terminal serves as a collaborative UE to send the collaborative information to the second terminal. In this case, the target parameter includes the source ID of the first terminal, and the condition information includes the user identifier of a collaborative UE.

5. The first terminal sends the collaborative information. Sending the collaborative information falls within the time window for sending the collaborative information notified by the second terminal in the first SCI. The collaborative information includes at least one resource set. The at least one resource set may be composed of recommended resources or available resources or may be composed of un-recommended resources.

For example, the first terminal determines the set of recommended resources in the following mode: The first terminal determines, by monitoring the SCI of another non-first terminal, an occupied resource indicated by the non-first terminal and obtains, by measuring the PSCCH DMRS or PSSCH DRMS of the non-first terminal, the corresponding RSRP. The first terminal excludes resources indicated as being occupied by a non-first terminal within the time window of resource selection or indicated as being occupied where corresponding RSRP is greater than the RSRP threshold. The remaining resources are marked as setA1 that is a set of resources recommended by the first terminal.

In this example, the second terminal receives the collaborative information sent by the first terminal, selects a resource based on the collaborative information, and determines, based on the second bitmap indicated by the first terminal, a resource set setA2. In addition, the second terminal acquires, by monitoring the SCI of another non-second terminal, an occupied resource indicated by the non-second terminal. The second terminal acquires, by measuring the PSCCH DMRS or PSSCH DRMS of the non-second terminal, the RSRP between the second terminal and the non-second terminal. The first terminal excludes resources indicated as being occupied by a non-first terminal within the time window of resource selection or indicated as being occupied where corresponding RSRP is greater than the threshold. The remaining resources are marked as setA3.

The second terminal obtains an intersection of the setA2 and setA3 and then randomly selects a resource from the intersection to transmit signaling and data. If resources contained in the intersection of the setA2 and setA3 are not enough, the second terminal ignores the setA2 and randomly selects a resource from the setA3.

Example 5 (The second terminal indicates the condition information, and when the target parameter satisfies the restriction of the condition information, the first terminal serves as a collaborative UE to send the collaborative information to the target terminal.)

Figure 8:
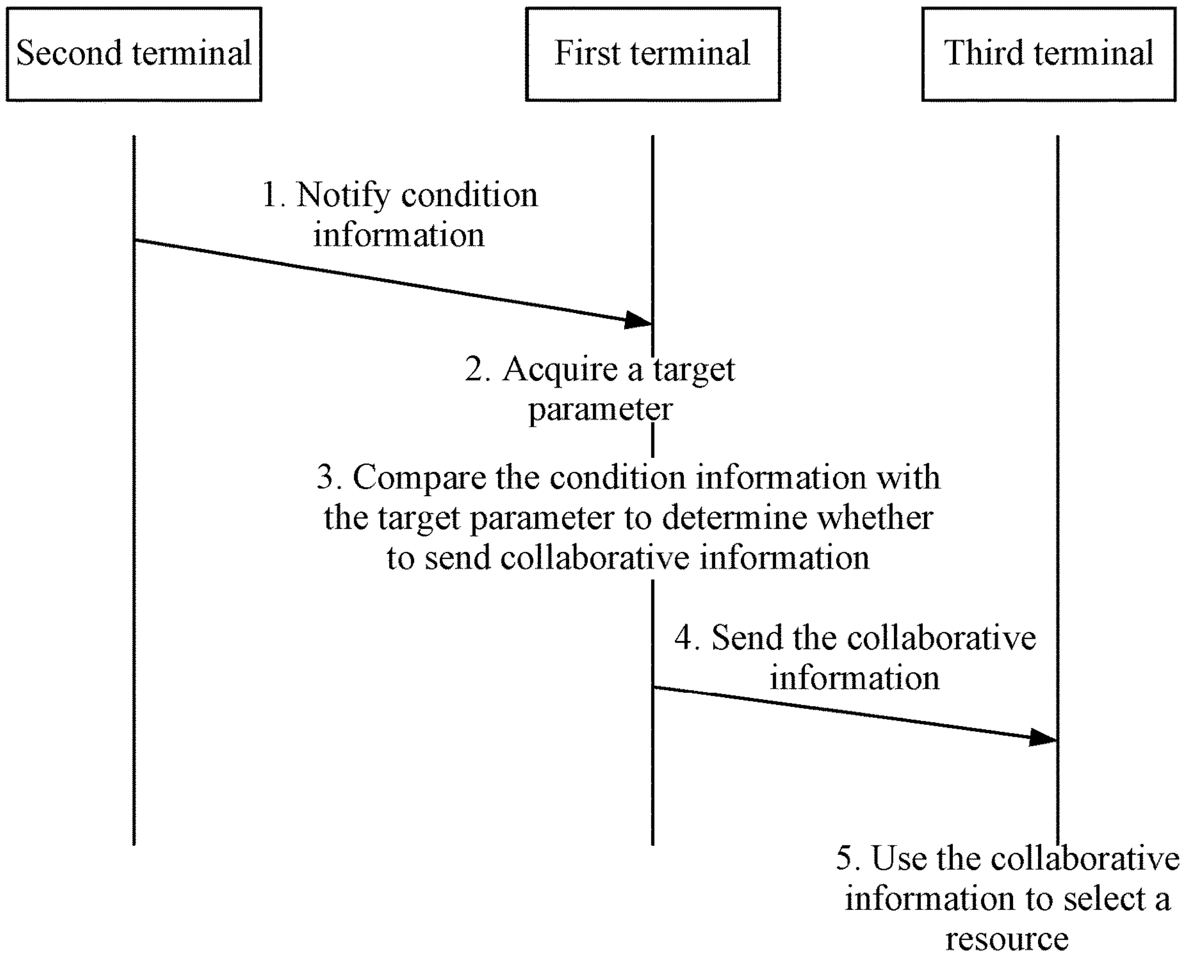
FIG. 8 is a diagram illustrating the sending process of collaborative information according to another embodiment.

FIG. 8 is a diagram illustrating the sending process of collaborative information according to another embodiment. As shown in FIG. 8, the process of sending the collaborative information mainly includes 1 to 5.

1. The second terminal indicates, through the first SCI, condition information to the first terminal. The condition information includes the threshold of a remainder obtained from dividing an included angle between the movement direction of the first terminal and the movement direction of the target terminal by $\pi/2$, for example, $\pi/12$ radians and the threshold of the distance between the first terminal and the target terminal, for example, 300 meters.

2: The first terminal acquires, according to the SCI of the target terminal, a target parameter. The target parameters include a remainder obtained from dividing an included angle $\alpha$ between the movement direction of the first terminal and the movement direction of the target terminal by $\pi/2$, and the distance between the first terminal and the target terminal.

The first terminal calculates, based on the target terminal's movement direction indicated by the target terminal's SCI and the first terminal's movement direction, an included angle $\alpha$ between the movement direction of the first terminal and the movement direction of the target terminal, and acquires a remainder of $\alpha$ divided by $\pi/2$.

The first terminal acquires the zone identifier of the target terminal indicated by a bit in the SCI of the target terminal and determines, based on the zone identifier of the first terminal and the zone identifier of the target terminal, the distance between the first terminal and the target terminal. The zone identifier is used to represent a rectangular area. The first terminal calculates center location coordinates of a rectangular area corresponding to the zone identifier of the first terminal and center location coordinates of a rectangular area corresponding to the zone identifier of the target terminal, and calculates, based on the two center location coordinates, the distance between the first terminal and the target terminal.

3. For each target terminal (the target terminal is a collaborative UE that supports sending of the collaborative information), the first terminal compares the target parameter and the condition information to determine whether to send the collaborative information.

If the number of collaborative UEs satisfying the following conditions is less than the number threshold, the first terminal can serve as a collaborative UE to send the collaborative information:

A remainder obtained from dividing an included angle $\alpha$ between the movement direction of the first terminal and the movement direction of the target terminal by $\pi/2$ is less than $\pi/12$ radians. The distance between the first terminal and the target terminal is less than 300 meters. The target terminal is a collaborative UE that can send the collaborative information.

4. If the target parameter satisfies the restriction of the condition information, the first terminal can serve as a collaborative UE to send the collaborative information to a third terminal, indicating a resource set recommended to the third terminal or a resource set that is not recommended to be used by the third terminal.

For example, the resource set corresponding to the collaborative information is a resource set recommended by the first terminal. The first terminal acquires the recommended set of resources in the following mode: The first terminal acquires, by monitoring the SCI of a non-first terminal, an occupied resource indicated by the non-first terminal. The first terminal acquires, by measuring the PSCCH DMRS or PSSCH DRMS of the non-first terminal, the RSRP of the reference signal of the non-first terminal received by the first terminal. The first terminal excludes resources that are indicated as being occupied by the non-first terminal within the time window of resource selection where corresponding RSRP is greater than the threshold. The remaining resources are marked as setA1 that is a set of resources recommended by the first terminal.

5. The third terminal may be the same as the second terminal or may be a different terminal. The third terminal receives the collaborative information sent by the first terminal, selects a resource based on the collaborative information, and determines, based on the second bitmap indicated by the first terminal, a resource set setA2. In addition, the third terminal acquires, by monitoring the SCI of another non-third terminal, an occupied resource indicated by the non-third terminal. The third terminal acquires, by measuring the PSCCH DMRS or PSSCH DRMS of the non-third terminal, the RSRP of the reference signal of the non-third terminal received by the third terminal. The third terminal excludes resources indicated as being occupied by the non-third terminal within the time window of resource selection where corresponding RSRP is greater than the threshold. The remaining resources are marked as setA3. The third terminal obtains an intersection of the setA2 and setA3 and then randomly selects a resource from the intersection to transmit signaling and data of the third terminal. If resources contained in the intersection of the setA2 and setA3 are not enough, the third terminal ignores the setA2 and randomly selects a resource from the setA3 to transmit signaling and data of the third terminal.

Example 6 (If the number of collaborative UEs satisfying the restriction condition is less than the number threshold, the first terminal can serve as a collaborative UE.)

In this example, the second terminal sends the condition information to the first terminal, and the first terminal acquires the target parameter. The first terminal compares the condition information with the target parameter to determine whether to send the collaborative information. The condition information is compared with the target parameter, and if the number of collaborative UEs found by the first terminal and satisfying the following conditions is less than the number threshold of the collaborative UEs, the first terminal serves as a collaborative UE to send the collaborative information:

A remainder obtained from dividing an included angle between the movement direction of the first terminal and the movement direction of the UE by $\pi/2$ is less than the threshold of a remainder obtained from dividing the included angle between the movement directions by $\pi/2$.

The distance between the first terminal and the UE is less than the distance threshold, for example, 300 meters. The UE is a collaborative UE.

As shown in FIG. 8, the process of sending the collaborative information mainly includes 1 to 5.

1. The second terminal indicates, through the first SCI, condition information. The condition information includes the threshold of a remainder obtained from dividing an included angle between the movement direction of the first terminal and the movement direction of the target terminal by π/2, for example, π/12 radians, the threshold of the distance between the first terminal and the target terminal, for example, 300 meters, and the number threshold of collaborative UEs, for example, 3.
2. The first terminal acquires, according to the SCI of the target terminal, a target parameter. The target parameters include a remainder obtained from dividing an included angle α between the movement direction of the first terminal and the movement direction of the target terminal by π/2, and the distance between the first terminal and the target terminal.

The first terminal calculates, based on the target terminal's movement direction indicated by the target terminal's SCI and the first terminal's movement direction, an included angle α between the movement direction of the first terminal and the movement direction of the target terminal, and acquires a remainder of α divided by π/2.

The first terminal acquires the zone identifier of the target terminal indicated by a bit in the SCI of the target terminal and determines, based on the zone identifier of the first terminal and the zone identifier of the target terminal, the distance between the first terminal and the target terminal. The zone identifier is used to represent a rectangular area. The first terminal calculates center location coordinates of a rectangular area corresponding to the zone identifier of the first terminal and center location coordinates of a rectangular area corresponding to the zone identifier of the target terminal, and calculates, based on the two center location coordinates, the distance between the first terminal and the target terminal.

3. For each target terminal (the target terminal is a collaborative UE that supports sending of the collaborative information), the first terminal compares the target parameter and the condition information to determine whether to send the collaborative information.

If the number of collaborative UEs satisfying the following conditions is less than the number threshold, the first terminal can serve as a collaborative UE to send the collaborative information:

A remainder obtained from dividing an included angle α between the movement direction of the first terminal and the movement direction of the target terminal by π/2 is less than π/12 radians. The distance between the first terminal and the target terminal is less than 300 meters. The target terminal is a collaborative UE that can send the collaborative information.

4. If the number of collaborative UEs satisfying the preceding conditions is less than the number threshold, the first terminal can serve as a collaborative UE to send the collaborative information to a third terminal, indicating a resource set recommended to the third terminal or a resource set that is not recommended to be used by the third terminal.

For example, the resource set corresponding to the collaborative information is a resource set recommended by the first terminal. The first terminal acquires the recommended set of resources in the following mode: The first terminal acquires, by monitoring the SCI of a non-first terminal, an occupied resource indicated by the non-first terminal. The first terminal acquires, by measuring the PSCCH DMRS or PSSCH DRMS of the non-first terminal, the RSRP of the reference signal of the non-first terminal received by the first terminal. The first terminal excludes resources indicated as being occupied by the non-first terminal within the time window of resource selection where corresponding RSRP is greater than the threshold. The remaining resources are marked as setA1 that is a set of resources recommended by the first terminal.

5. The third terminal may be the same as the second terminal or may be a different terminal. The third terminal receives the collaborative information sent by the first terminal, selects a resource based on the collaborative information, and determines, based on the second bitmap indicated by the first terminal, a resource set setA2. In addition, the third terminal acquires, by monitoring the SCI of the non-third terminal, an occupied resource indicated by the non-third terminal. The third terminal acquires, by measuring the PSCCH DMRS or PSSCH DRMS of the non-third terminal, the RSRP of the reference signal of the non-third terminal received by the third terminal. The third terminal excludes resources indicated as being occupied by the non-third terminal within the time window of resource selection where corresponding RSRP is greater than the threshold. The remaining resources are marked as setA3. The third terminal obtains an intersection of the setA2 and setA3 and then randomly selects a resource from the intersection to transmit signaling and data of the third terminal. If resources contained in the intersection of the setA2 and setA3 are not enough, the third terminal ignores the setA2 and randomly selects a resource from the setA3 to transmit signaling and data of the third terminal.

Example 7 (The second terminal indicates the condition information, and when the target parameter satisfies the restriction of the condition information, the first terminal determines whether to cancel transmitting the collaborative information before transmitting the collaborative information.)

In this example, the second terminal sends the condition information to the first terminal, and the first terminal acquires the target parameter. The first terminal compares the condition information with the target parameter to determine whether to send the collaborative information. The process is as follows:

The first terminal determines, by comparing the condition information with the target parameter, whether to send the collaborative information. The first terminal selects a target time-frequency resource that is used to transmit the collaborative information. Before transmitting the collaborative information, the first terminal detects the third SCI sent by another non-first terminal and determines, based on the detection result, whether to cancel sending the collaborative information.

If the first terminal does not cancel transmitting the collaborative information, the first terminal sends the collaborative information to the third terminal, and the third terminal receives the collaborative information, and determines, based on the collaborative information, a resource for transmitting signaling or information.

Figure 9:
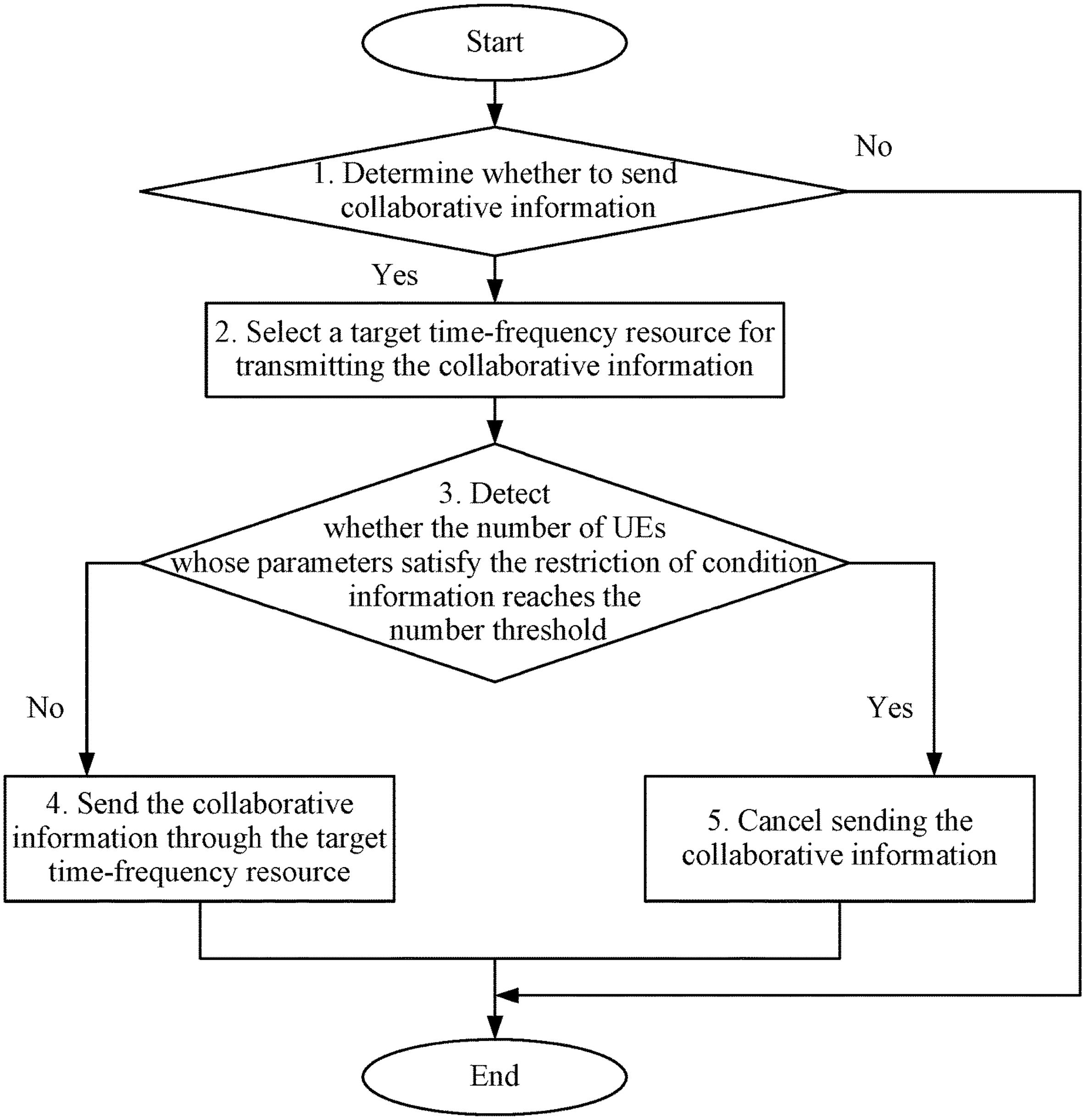
FIG. 9 is a diagram illustrating the sending process of collaborative information according to another embodiment.

FIG. 9 is a diagram illustrating the sending process of collaborative information according to another embodiment.

As shown in FIG. 9, the process of sending the collaborative information mainly includes 1 to 5.

1. The first terminal determines whether to send collaborative information.

The determination process includes the following procedures.

1-1. The second terminal indicates, through the first SCI, condition information. The condition information includes the threshold of a remainder obtained from dividing an included angle between the movement direction of the first terminal and the movement direction of the target terminal by π/2, for example, π/12 radians, the threshold of the distance between the first terminal and the target terminal, for example, 300 meters, and the number threshold of collaborative UEs, for example, 3.

1-2. The first terminal acquires, according to the SCI of the target terminal, a target parameter. The target parameters include a remainder obtained from dividing an included angle α between the movement direction of the first terminal and the movement direction of the target terminal by π/2, and the distance between the first terminal and the target terminal.

The first terminal calculates, based on the target terminal's movement direction indicated by the target terminal's SCI and the first terminal's movement direction, an included angle α between the movement direction of the first terminal and the movement direction of the target terminal, and acquires a remainder of α divided by π/2.

The first terminal acquires the zone identifier of the target terminal indicated by a bit in the SCI of the target terminal and determines, based on the zone identifier of the first terminal and the zone identifier of the target terminal, the distance between the first terminal and the target terminal. The zone identifier is used to represent a rectangular area. The first terminal calculates center location coordinates of a rectangular area corresponding to the zone identifier of the first terminal and center location coordinates of a rectangular area corresponding to the zone identifier of the target terminal, and calculates, based on the two center location coordinates, the distance between the first terminal and the target terminal.

1-3. For each target terminal (the target terminal is a collaborative UE that supports sending of the collaborative information), the first terminal compares the target parameter and the condition information to determine whether to send the collaborative information.

If the number of collaborative UEs satisfying the following conditions is less than the number threshold, the first terminal can serve as a collaborative UE to send the collaborative information:

A remainder obtained from dividing an included angle α between the movement direction of the first terminal and the movement direction of the target terminal by π/2 is less than π/12 radians. The distance between the first terminal and the target terminal is less than 300 meters. The target terminal is a collaborative UE that can send the collaborative information.

2. After determining to send the collaborative information, the first terminal selects a target time-frequency resource for transmitting the collaborative information.

Figure 10:
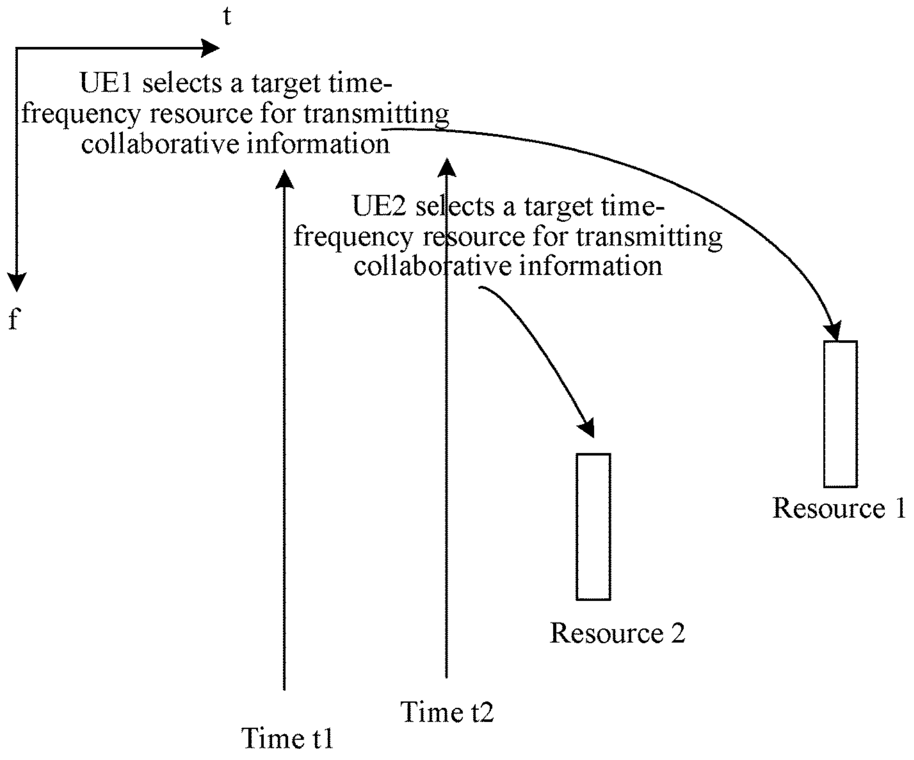
FIG. 10 is a diagram in which a target time-frequency resource is selected according to an embodiment.

FIG. 10 is a diagram in which a target time-frequency resource is selected according to an embodiment. As shown in FIG. 10, UE1, as a first terminal, selects resource 1 as the target time-frequency resource for transmitting the collaborative information at time t1; UE2, as a first terminal, selects resource 2 as the target time-frequency resource for transmitting the collaborative information at time t2.

3. The first terminal, before actually transmitting the collaborative information, detects the third SCI sent by a non-first terminal and determines, based on the detection result, whether to cancel transmitting the collaborative information. For example, the number threshold is 1, that is, if the first terminal detects that the third SCI sent by any UE satisfies the restriction of the condition information, the first terminal does not send the collaborative information.

If the first terminal, before actually sending the collaborative information, detects that the third SCI from another non-first terminal satisfies the following conditions, the first terminal cancels sending the collaborative information:

The third SCI is used to notify the time-frequency resource of the collaborative information sent by the UE. The value of a remainder obtained from dividing an included angle between the movement direction of the first terminal and the movement direction of the UE by π/2 is less than the threshold of a remainder obtained from dividing the included angle between the movement directions by π/2, for example, π/12 radians. The distance between the first terminal and the UE is less than the distance threshold of 300 meters.

FIG. 10 is used as an example. The first terminal is UE2. UE2 detects no third SCI from another UE that satisfies the preceding three conditions. Therefore, the UE2 does not cancel transmitting the collaborative information. The first terminal is UE1. UE1 detects the third SCI from the UE2 satisfying the preceding three restriction conditions. Therefore, the UE1 cancels transmitting the collaborative information.

4. If the first terminal detects no third SCI that satisfies the restriction of the condition information, the first terminal sends the collaborative information through the selected target time-frequency resource and indicates to the third terminal a resource set recommended to the third terminal or a resource set that is not recommended to be used by the third terminal.

For example, the resource set corresponding to the collaborative information is a resource set recommended by the first terminal. The first terminal acquires the recommended set of resources in the following mode: The first terminal acquires, by monitoring the SCI of a non-first terminal, an occupied resource indicated by the non-first terminal. The first terminal acquires, by measuring the PSCCH DMRS or PSSCH DRMS of the non-first terminal, the RSRP of the reference signal of the non-first terminal received by the first terminal. The first terminal excludes resources indicated as being occupied by the non-first terminal within the time window of resource selection where corresponding RSRP is greater than the threshold. The remaining resources are marked as setA1 that is a set of resources recommended by the first terminal.

5. The first terminal detects the third SCI satisfying the restriction of the condition information and cancels sending the collaborative information.

In this example, the third terminal may be the same as the second terminal or may be a different terminal. The third terminal receives the collaborative information sent by the first terminal, selects a resource based on the collaborative information, and determines, based on the second bitmap indicated by the first terminal, a resource set setA2. In addition, the third terminal acquires, by monitoring the SCI of a non-third terminal, an occupied resource indicated by the non-third terminal. The third terminal acquires, by measuring the PSCCH DMRS or PSSCH DRMS of the non-third terminal, the RSRP of the reference signal of the non-third terminal received by the third terminal. The third terminal excludes resources indicated as being occupied by the non-third terminal within the time window of resource selection where corresponding RSRP is greater than the threshold. The remaining resources are marked as setA3. The third terminal obtains an intersection of the setA2 and setA3 and then randomly selects a resource from the intersection to transmit signaling or data of the third terminal. If resources contained in the intersection of the setA2 and setA3 are not enough, the third terminal ignores the setA2 and randomly selects a resource from the setA3 to transmit signaling or data of the third terminal.

In the preceding examples, both the target parameter and the condition information are described by using an example where a remainder of an included angle between the movement directions is compared with the threshold of a remainder of an included angle between the movement directions. The comparison may be replaced with or added by one or more of the following:

The road direction indicated by the target terminal to the first terminal is compared with the road direction where the first terminal is located. The road identifier indicated by the target terminal to the first terminal is compared with the road identifier where the first terminal is located. The range of the road direction indicated by the target terminal to the first terminal is compared with the road direction where the first terminal is located. The movement direction indicated by the target terminal to the first terminal is compared with the movement direction of the first terminal. The range of the movement direction indicated by the target terminal to the first terminal is compared with the movement direction of the first terminal. An included angle between the movement direction of the first terminal and the movement direction of the target terminal is compared with the threshold of an included angle between the movement directions. An included angle between the road direction in which the first terminal is located and the road direction in which the target terminal is located is compared with the threshold of an included angle between the road directions. A remainder of an included angle between the road direction in which the first terminal is located and the road direction in which the target terminal is located is compared with the threshold of a remainder of an included angle between the road directions.

Embodiments of the present application also provide a resource determination method that may be applied to a second terminal. The second terminal may be a transmitting terminal using a groupcast or broadcast mode. The second terminal determines, according to collaborative information sent by a first terminal, a recommended or un-recommended resource, thereby reducing conflicts or interference between different resources and improving the reliability of the sidelink communication. The method is also applicable to a scenario where the transmitting terminal adopts a unicast communication mode. The second terminal is a target terminal of the first terminal. For technical details not described in detail in this embodiment, reference may be made to any one of the preceding embodiments.

Figure 11:
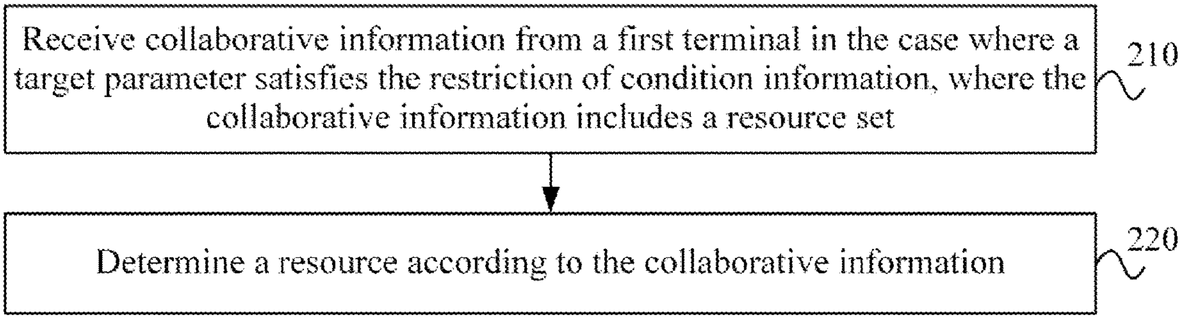
FIG. 11 is a flowchart of a resource determination method according to an embodiment.

FIG. 11 is a flowchart of a resource determination method according to an embodiment. As shown in FIG. 11, the method provided by this embodiment includes 210 and 220.

210: Collaborative information sent by a first terminal is received in the case where a target parameter satisfies the restriction of condition information, where the collaborative information includes a resource set.

220: According to the collaborative information, a resource is determined.

In an embodiment, 200 is also included.

200: The first SCI is sent to the first terminal. The first SCI includes at least one of the movement direction of the second terminal; the road direction of the second terminal; or the zone identifier of the second terminal.

In an embodiment, 202 is also included.

202: The first SCI is sent to the first terminal. The first SCI includes request information that includes at least one of a user identifier of a collaborative UE or a first bitmap. The first bitmap is configured to indicate a collaborative UE or request the first terminal to send the collaborative information.

In an embodiment, 204 is also included.

204: The first SCI is sent to the first terminal. The first SCI includes request information including a user identifier of a collaborative UE. The user identifier of the collaborative UE is a source identifier of the collaborative UE.

In an embodiment, 206 is also included.

206: The first SCI is sent to the first terminal. The first SCI includes at least one of the road direction indicated by a second terminal to the first terminal; the range of the road direction indicated by a second terminal to the first terminal; a road identifier indicated by a second terminal to the first terminal; the movement direction indicated by a second terminal to the first terminal; the range of the movement direction indicated by a second terminal to the first terminal; the threshold of an included angle between the movement direction of the first terminal and the movement direction of a target terminal; the value range of an included angle between the movement direction of the first terminal and the movement direction of a target terminal; the threshold of a remainder obtained from dividing an included angle between the movement direction of the first terminal and the movement direction of a target terminal by 90 or $\pi/2$; the value range of a remainder obtained from dividing an included angle between the movement direction of the first terminal and the movement direction of a target terminal by 90 or $\pi/2$; the threshold of an included angle between the road direction in which the first terminal is located and the road direction in which a target terminal is located; the value range of an included angle between the road direction in which the first terminal is located and the road direction in which a target terminal is located; the threshold of a remainder obtained from dividing an included angle between the road direction in which the first terminal is located and the road direction in which a target terminal is located by 90 or $\pi/2$; the value range of a remainder obtained from dividing an included angle between the road direction in which the first terminal is located and the road direction in which a target terminal is located by 90 or $\pi/2$; the threshold of the distance between the first terminal and a target terminal; the value range of the distance between the first terminal and a target terminal; the threshold of RSRP; the value range of RSRP; or the number threshold of collaborative UEs.

In an embodiment, 208 is also included.

208: The second SCI is received, which is configured to indicate that the first terminal supports for being a collaborative terminal.

In an embodiment, the collaborative information includes a second bitmap, and each bit in the second bitmap is configured to indicate that one sub-channel on one slot is a recommended resource or an un-recommended resource.

Figure 12:
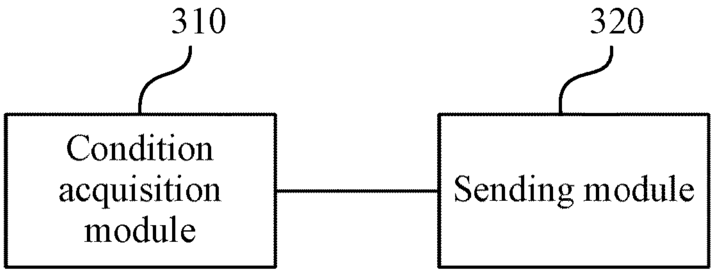
FIG. 12 is a diagram illustrating the structure of a collaborative information sending apparatus according to an embodiment.
Figure 13:
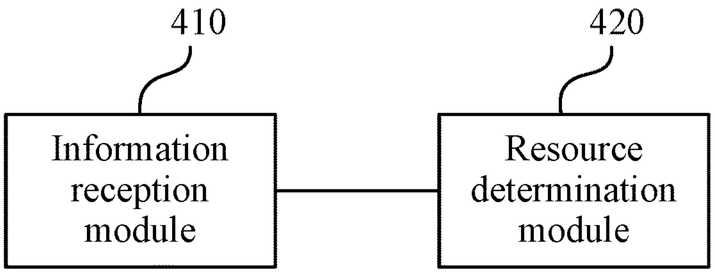
FIG. 13 is a diagram illustrating the structure of a resource determination apparatus according to an embodiment.

Embodiments of the present application also provide a collaborative information sending apparatus. FIG. 12 is a diagram illustrating the structure of the collaborative information sending apparatus according to an embodiment. As shown in FIG. 13, the collaborative information sending apparatus includes a condition acquisition module 310 and a sending module 320.

The condition acquisition module 310 is configured to acquire condition information. The sending module 320 is configured to send collaborative information in the case where a target parameter satisfies the restriction of the condition information. The collaborative information includes a resource set.

The collaborative information sending apparatus in this embodiment is aimed at a transmitting terminal that adopts a groupcast or broadcast mode. The first terminal may determine whether the first terminal can serve as a collaborative terminal. If the first terminal can serve as a collaborative terminal, the first terminal sends collaborative information and recommends a proper resource set to the transmitting terminal, thereby reducing conflicts or interference between different resources and improving the reliability of the sidelink communication. The method is also applicable to a scenario where a transmitting terminal adopts a unicast communication mode.

In an embodiment, the condition information is pre-configured or pre-stored information, information configured through RRC signaling, or information determined according to the first SCI sent by a second terminal.

In an embodiment, the condition information includes at least one of the road direction indicated by a target terminal to the first terminal; the range of the road direction indicated by a target terminal to the first terminal; a road identifier indicated by a target terminal to the first terminal; the movement direction indicated by a target terminal to the first terminal; the range of the movement direction indicated by a target terminal to the first terminal; the threshold of an included angle between the movement direction of the first terminal and the movement direction of a target terminal; the value range of an included angle between the movement direction of the first terminal and the movement direction of a target terminal; the threshold of a remainder obtained from dividing an included angle between the movement direction of the first terminal and the movement direction of a target terminal by 90 or $\pi/2$; the value range of a remainder obtained from dividing an included angle between the movement direction of the first terminal and the movement direction of a target terminal by 90 or $\pi/2$; the threshold of an included angle between the road direction in which the first terminal is located and the road direction in which a target terminal is located; the value range of an included angle between the road direction in which the first terminal is located and the road direction in which a target terminal is located; the threshold of a remainder obtained from dividing an included angle between the road direction in which the first terminal is located and the road direction in which a target terminal is located by 90 or $\pi/2$; the value range of a remainder obtained from dividing an included angle between the road direction in which the first terminal is located and the road direction in which a target terminal is located by 90 or $\pi/2$; the threshold of the distance between the first terminal and a target terminal; the value range of the distance between the first terminal and a target terminal; the threshold of RSRP; the value range of RSRP; or the number threshold of collaborative UEs.

In an embodiment, the condition information includes the first SCI sent by a second terminal, and the first SCI includes request information that includes at least one of a user identifier of a collaborative UE or a first bitmap. The first bitmap is configured to indicate a collaborative UE or request the first terminal to send the collaborative information.

In an embodiment, the condition information includes the first SCI sent by a second terminal, and the first SCI includes request information including a user identifier of a collaborative UE. The user identifier of the collaborative UE is a source identifier of the collaborative UE.

In an embodiment, the target parameter includes at least one of the road direction in which the first terminal is located; a road identifier in which the first terminal is located; the movement direction of the first terminal; the distance between the first terminal and the target terminal; RSRP of a reference signal of the target terminal received by the first terminal; an included angle between the road direction in which the first terminal is located and the road direction in which the target terminal is located; a remainder obtained from dividing an included angle between the road direction in which the first terminal is located and the road direction in which the target terminal is located by 90 or $\pi/2$; an included angle between the movement direction of the first terminal and the movement direction of the target terminal; or a remainder obtained from dividing an included angle between the movement direction of the first terminal and the movement direction of the target terminal by 90 or $\pi/2$.

In an embodiment, the target parameter includes at least one of the user identifier of the first terminal or the corresponding location of the first terminal in a bitmap.

In an embodiment, a movement direction determination module is also included.

The movement direction determination module is configured to determine, according to the first SCI sent by a second terminal, the movement direction of the second terminal.

In an embodiment, a road direction determination module is also included.

The road direction determination module is configured to determine, according to the first SCI sent by a second terminal, the road direction of the second terminal.

In an embodiment, a distance determination module is also included.

The distance determination module is configured to determine, according to the zone identifier in first SCI sent by a second terminal and the zone identifier of the first terminal, the distance between the first terminal and the second terminal.

In an embodiment, the sending module 320 is configured to send the collaborative information in the case where the number of collaborative UEs is less than the number threshold of the collaborative UEs.

In an embodiment, the sending module 320 is configured to send the collaborative information in the case where the user identifier of the first terminal belongs to the user identifier of a collaborative UE.

In an embodiment, the sending module 320 is configured to send the collaborative information in the case where bit indication of the corresponding location of the first terminal in a bitmap is a set value.

In an embodiment, a first indication module is also included.

The first indication module is configured to send the second SCI. The second SCI is configured to indicate that the first terminal supports for being a collaborative terminal.

In an embodiment, a second indication module is also included.

The second indication module is configured to send the second SCI. The second SCI is configured to indicate a time limit for the first terminal to serve as a collaborative terminal.

In an embodiment, a detection module and a cancellation module are also included.

The detection module is configured to detect the third SCI. The cancellation module is configured to send or cancel, according to the detection result of the third SCI, the collaborative information.

In an embodiment, the collaborative information includes a second bitmap, and each bit in the second bitmap is configured to indicate that one sub-channel on one slot is a recommended resource or an un-recommended resource.

The collaborative information sending apparatus provided in this embodiment and the collaborative information sending method provided in the preceding embodiments belong to the same concept. For technical details not described in detail in this embodiment, reference may be made to any one of the preceding embodiments. The embodiment has the same effects as executing the collaborative information sending method.

Embodiments of the present application also provide a resource determination apparatus. FIG. 13 is a diagram illustrating the structure of a resource determination apparatus according to an embodiment. As shown in FIG. 13, the resource determination apparatus includes an information reception module 410 and a resource determination module 420.

The information reception module 410 is configured to receive collaborative information sent by a first terminal in the case where a target parameter satisfies the restriction of condition information. The collaborative information includes a resource set. The resource determination module 420 is configured to determine, according to the collaborative information, a resource.

In the resource determination apparatus of this embodiment, the second terminal may be a transmitting terminal that adopts a groupcast or broadcast mode. The second terminal determines, according to collaborative information sent by a first terminal, a recommended or un-recommended resource, thereby reducing conflicts or interference between different resources and improving the reliability of the sidelink communication. The method is also applicable to a scenario where a transmitting terminal adopts a unicast communication mode.

In an embodiment, a first sending module is also included.

The first sending module is configured to send the first SCI to the first terminal. The first SCI includes at least one of the movement direction of the second terminal; the road direction of the second terminal; or the zone identifier of the second terminal.

In an embodiment, a second sending module is also included.

The second sending module is configured to send the first SCI to the first terminal. The first SCI includes request information that includes at least one of a user identifier of a collaborative UE or a first bitmap. The first bitmap is configured to indicate a collaborative UE or request the first terminal to send the collaborative information.

In an embodiment, a third sending module is also included.

The third sending module is configured to send the first SCI to the first terminal. The first SCI includes request information including a user identifier of a collaborative UE. The user identifier of the collaborative UE is a source identifier of the collaborative UE.

In an embodiment, a fourth sending module is also included.

The fourth sending module is configured to send the first SCI to the first terminal. The first SCI includes at least one of the road direction indicated by a second terminal to the first terminal; the range of the road direction indicated by a second terminal to the first terminal; a road identifier indicated by a second terminal to the first terminal; the movement direction indicated by a second terminal to the first terminal; the range of the movement direction indicated by a second terminal to the first terminal; the threshold of an included angle between the movement direction of the first terminal and the movement direction of a target terminal; the value range of an included angle between the movement direction of the first terminal and the movement direction of a target terminal; the threshold of a remainder obtained from dividing an included angle between the movement direction of the first terminal and the movement direction of a target terminal by 90 or $\pi/2$; the value range of a remainder obtained from dividing an included angle between the movement direction of the first terminal and the movement direction of a target terminal by 90 or $\pi/2$; the threshold of an included angle between the road direction in which the first terminal is located and the road direction in which a target terminal is located; the value range of an included angle between the road direction in which the first terminal is located and the road direction in which a target terminal is located; the threshold of a remainder obtained from dividing an included angle between the road direction in which the first terminal is located and the road direction in which a target terminal is located by 90 or $\pi/2$; the value range of a remainder obtained from dividing an included angle between the road direction in which the first terminal is located and the road direction in which a target terminal is located by 90 or $\pi/2$; the threshold of the distance between the first terminal and a target terminal; the value range of the distance between the first terminal and a target terminal; the threshold of RSRP; the value range of RSRP; or the number threshold of collaborative UEs.

In an embodiment, a reception module is also included.

The reception module is configured to receive the second SCI. The second SCI is configured to indicate that the first terminal supports for being a collaborative terminal.

In an embodiment, the collaborative information includes a second bitmap, and each bit in the second bitmap is configured to indicate that one sub-channel on one slot is a recommended resource or an un-recommended resource.

The resource determination apparatus provided in this embodiment and the resource determination method provided in the preceding embodiments belong to the same concept. For technical details not described in detail in this embodiment, reference may be made to any one of the preceding embodiments, and this embodiment has the same effects as executing the resource determination method.

Figure 14:
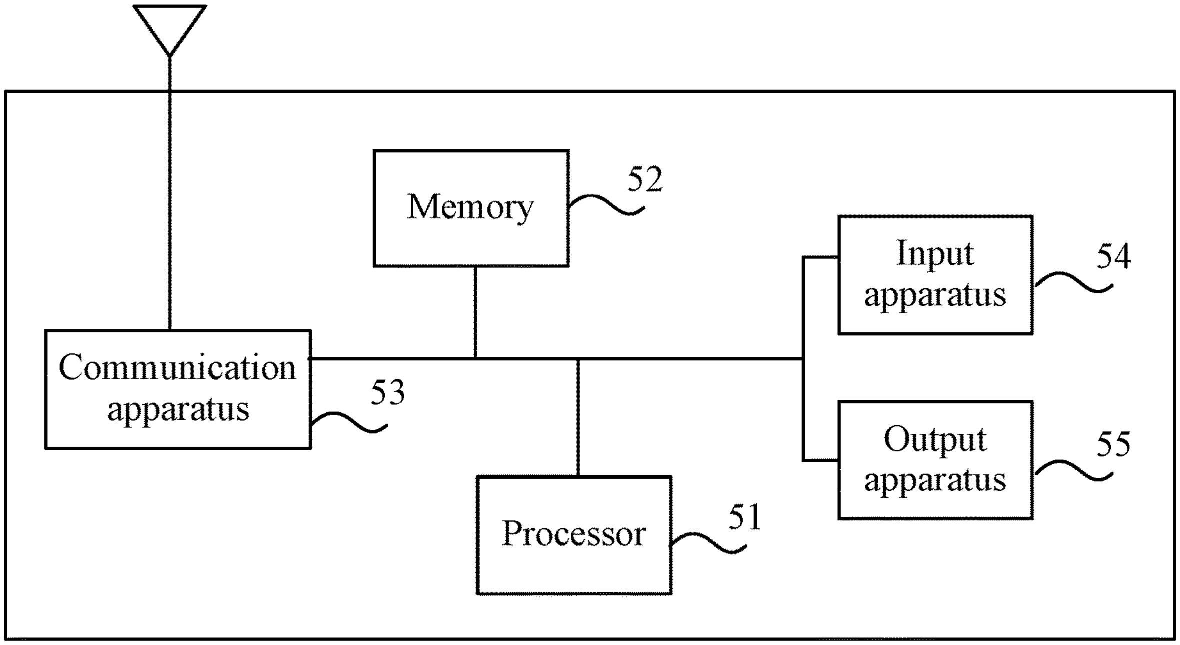
FIG. 14 is a diagram illustrating the structure of hardware of a communication node according to an embodiment.

Embodiments of the present application also provide a communication node. FIG. 14 is a diagram illustrating the structure of hardware of a communication node according to an embodiment. As shown in FIG. 14, the communication node provided by this embodiment includes a memory 52, a processor 51, and a computer program stored on the memory and running on the processor. When executing the program, the processor 51 performs the preceding collaborative information sending method or the resource determination method.

The communication node may also include the memory 52. One or more processors 51 may be provided in the communication node. One processor 51 is used as an example in FIG. 14. The memory 52 is configured to store one or more programs. When executed by the one or more processors 51, the one or more programs cause the one or more processors 51 to perform the collaborative information sending method or the resource determination method described in the embodiments of the present application.

The communication node also includes a communication apparatus 53, an input apparatus 54, and an output apparatus 55.

The processor 51, the memory 52, the communication apparatus 53, the input apparatus 54, and the output apparatus 55 in the communication node may be connected via a bus or in other manners. Connection via the bus is used as an example in FIG. 14.

The input apparatus 54 may be configured to receive input digital or character information and generate key signal input related to user settings and function control of the communication node. The output apparatus 55 may include a display device, for example, a display screen.

The communication apparatus 53 may include a receiver and a sender. The communication apparatus 53 is configured to perform information transceiving and communication under the control of the one or more processors 51.

As a computer-readable storage medium, the memory 52 may be configured to store software programs, computer-executable programs, and modules such as program instructions/modules corresponding to the collaborative information sending method described in the embodiments of the present application (for example, the condition acquisition module 310 and the sending module 320 in the collaborative information sending apparatus). The memory 52 may include a program storage region and a data storage region. The program storage region may store an operating system and an application program required by at least one function. The data storage region may store data or the like created according to the use of the communication node. Additionally, the memory 52 may include a high-speed random-access memory and may also include a nonvolatile memory such as at least one disk memory, flash memory, or another nonvolatile solid-state memory. In some examples, the memory 52 may include memories that are remotely disposed with respect to the processor 51, and these remote memories may be connected to the communication node via a network. Examples of the preceding network include, but are not limited to, the Internet, an intranet, a local area network, a mobile communication network, and a combination thereof.

Embodiments of the present application also provide a storage medium storing a computer program that, when executed by a processor, performs the collaborative information sending method or the resource determination method described in any embodiment of the present application.

The collaborative information sending method includes acquiring condition information and sending collaborative information in the case where a target parameter satisfies the restriction of the condition information. The collaborative information includes a resource set.

The resource determination method includes receiving collaborative information sent by a first terminal in the case where a target parameter satisfies the restriction of condition information, where the collaborative information includes a resource set; and determining, according to the collaborative information, a resource.

A computer storage medium in this embodiment of the present application may adopt any combination of one or more computer-readable media. The computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus, or device, or any combination thereof. Examples (a non-exhaustive list) of the computer-readable storage medium include an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any suitable combination thereof. The computer-readable storage medium may be any tangible medium including or storing a program. The program may be used by or used in conjunction with an instruction execution system, apparatus, or device.

The computer-readable signal medium may include a data signal propagated in a baseband or as part of a carrier. The data signal carries computer-readable program codes. This propagated data signal may take multiple forms that include, but are not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus or device.

The program codes included on the computer-readable medium may be transmitted on any suitable medium including, but not limited to, a wireless medium, a wire, an optical cable, a radio frequency (RF), or any suitable combination thereof.

Computer program codes for performing the operations of the present application may be written in one or more programming languages or a combination of multiple programming languages. The programming languages include object-oriented programming languages such as Java, Smalltalk, and C++ and may also include conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In a case related to the remote computer, the remote computer may be connected to the user computer via any type of network including a local area network (LAN) or a wide area network (WAN) or may be connected to an external computer (for example, via the Internet by an Internet service provider).

The above are only example embodiments of the present application.

It is to be understood by those skilled in the art that the term user terminal encompasses any suitable type of wireless user devices, for example, a mobile phone, a portable data processing apparatus, a portable web browser, or a vehicle-mounted mobile station.

Generally speaking, various embodiments of the present application may be implemented in hardware or special-purpose circuits, software, logic, or any combination thereof. For example, some aspects may be implemented in hardware while another aspects may be implemented in firmware or software executable by a controller, a microprocessor, or another calculation apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program procedures, may represent interconnected logic circuits, modules, and functions, or may represent a combination of program procedures with logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory apparatus and system (a digital video disc (DVD) or a compact disk (CD)). Computer-readable medium may include a non-transitory storage medium. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A collaborative information sending method, the method being applied to a first terminal and comprising:

acquiring condition information, wherein the condition information is information determined according to first sidelink control information (SCI) sent by a second terminal; and sending collaborative information in a case where a target parameter satisfies restriction of the condition information, wherein the collaborative information comprises a resource set;

the method further comprising: determining, according to the first SCI, a movement direction of the second terminal; or determining, according to the first SCI, a road direction of the second terminal; or determining, according to a zone identifier in the first SCI and a zone identifier of the first terminal, a distance between the first terminal and the second terminal.

2. The method of claim 1, wherein the condition information comprises at least one of:

a road direction indicated by a target terminal to the first terminal; a range of a road direction indicated by a target terminal to the first terminal; a road identifier indicated by a target terminal to the first terminal;

a movement direction indicated by a target terminal to the first terminal; a range of a movement direction indicated by a target terminal to the first terminal;

a threshold of an included angle between a movement direction of the first terminal and a movement direction of a target terminal; a value range of an included angle between a movement direction of the first terminal and a movement direction of a target terminal;

a threshold of a remainder obtained from dividing an included angle between a movement direction of the first terminal and a movement direction of a target terminal by 90 or $\pi/2$; a value range of a remainder obtained from dividing an included angle between a movement direction of the first terminal and a movement direction of a target terminal by 90 or $\pi/2$;

a threshold of an included angle between a road direction in which the first terminal is located and a road direction in which a target terminal is located; a value range of an included angle between a road direction in which the first terminal is located and a road direction in which a target terminal is located;

a threshold of a remainder obtained from dividing an included angle between a road direction in which the first terminal is located and a road direction in which a target terminal is located by 90 or $\pi/2$; a value range of a remainder obtained from dividing an included angle between a road direction in which the first terminal is located and a road direction in which a target terminal is located by 90 or $\pi/2$;

a threshold of a distance between the first terminal and a target terminal; a value range of a distance between the first terminal and a target terminal;

a threshold of Reference Signal Received Power (RSRP); a value range of RSRP; or a number threshold of collaborative user equipments (UEs).

3. The method of claim 1, wherein the first SCI comprises request information that comprises at least one of:

a user identifier of a collaborative UE; or a first bitmap configured to indicate a collaborative UE or request the first terminal to send the collaborative information.

4. The method of claim 1, wherein the first SCI comprises request information comprising:

a user identifier of a collaborative UE, wherein the user identifier of the collaborative UE is a source identifier (ID) of the collaborative UE.

5. The method of claim 1, wherein the target parameter comprises at least one of:

a road direction in which the first terminal is located; a road identifier in which the first terminal is located;

a movement direction of the first terminal;

a distance between the first terminal and a target terminal;

RSRP of a reference signal of a target terminal received by the first terminal;

an included angle between a road direction in which the first terminal is located and a road direction in which a target terminal is located;

a remainder obtained from dividing an included angle between a road direction in which the first terminal is located and a road direction in which a target terminal is located by 90 or $\pi/2$;

an included angle between a movement direction of the first terminal and a movement direction of a target terminal; or a remainder obtained from dividing an included angle between a movement direction of the first terminal and a movement direction of a target terminal by 90 or $\pi/2$.

6. The method of claim 1, wherein the target parameter comprises at least one of:

a user identifier of the first terminal; or a corresponding location of the first terminal in a bitmap.

7. The method of claim 1, wherein sending the collaborative information in the case where the target parameter satisfies the restriction of the condition information comprises:

sending the collaborative information in a case where a number of at least one collaborative UE is less than a number threshold; or sending the collaborative information in a case where a user identifier of the first terminal belongs to a user identifier of a collaborative UE; or sending the collaborative information in a case where bit indication of a corresponding location of the first terminal in a bitmap is a set value.

8. The method of claim 1, further comprising:

sending second SCI, wherein the second SCI is configured to indicate that the first terminal supports for being a collaborative terminal; or sending second SCI, wherein the second SCI is configured to indicate a time limit for the first terminal to serve as a collaborative terminal.

9. The method of claim 1, further comprising:

detecting third SCI; and according to a detection result of the third SCI, sending the collaborative information or canceling sending the collaborative information.

10. The method of claim 1, wherein the collaborative information comprises a second bitmap, wherein each bit in the second bitmap is configured to indicate that one sub-channel on one slot is a recommended resource or an un-recommended resource.

11. A communication node, comprising a memory, a processor, and a computer program stored on the memory and running on the processor, wherein when executing the computer program, the processor performs the collaborative information sending method of claim 1.

12. A non-transitory computer-readable storage medium storing a computer program that, when executed by a processor, performs the collaborative information sending method of claim 1.

13. A resource determination method, the method being applied to a second terminal and comprising:

receiving collaborative information from a first terminal in a case where a target parameter satisfies restriction of condition information, wherein the collaborative information comprises a resource set; and determining, according to the collaborative information, a resource;

the method further comprising: sending first sidelink control information (SCI) to the first terminal, wherein the first SCI comprises at least one of a movement direction of the second terminal; a road direction of the second terminal; or a zone identifier of the second terminal.

14. The method of claim 13, wherein the first SCI further comprises request information that comprises at least one of:

a user identifier of a collaborative user equipment (UE); or a first bitmap configured to indicate a collaborative UE or request the first terminal to send the collaborative information.

15. The method of claim 13, wherein the first SCI further comprises request information comprising a user identifier of a collaborative UE, wherein the user identifier of the collaborative UE is a source identifier (ID) of the collaborative UE.

16. The method of claim 13, wherein the first SCI further comprises at least one of:

a road direction indicated by the second terminal to the first terminal; a range of a road direction indicated by the second terminal to the first terminal; a road identifier indicated by the second terminal to the first terminal;

a movement direction indicated by the second terminal to the first terminal; a range of a movement direction indicated by the second terminal to the first terminal;

a threshold of an included angle between a movement direction of the first terminal and a movement direction of a target terminal; a value range of an included angle between a movement direction of the first terminal and a movement direction of a target terminal;

a threshold of a remainder obtained from dividing an included angle between a movement direction of the first terminal and a movement direction of a target terminal by 90 or $\pi/2$; a value range of a remainder obtained from dividing an included angle between a movement direction of the first terminal and a movement direction of a target terminal by 90 or $\pi/2$;

a threshold of an included angle between a road direction in which the first terminal is located and a road direction in which a target terminal is located; a value range of an included angle between a road direction in which the first terminal is located and a road direction in which a target terminal is located;

a threshold of a remainder obtained from dividing an included angle between a road direction in which the first terminal is located and a road direction in which a target terminal is located by 90 or $\pi/2$; a value range of a remainder obtained from dividing an included angle between a road direction in which the first terminal is located and a road direction in which a target terminal is located by 90 or $\pi/2$;

a threshold of a distance between the first terminal and a target terminal; a value range of a distance between the first terminal and a target terminal;

a threshold of Reference Signal Received Power (RSRP); a value range of RSRP; or a number threshold of collaborative UEs.

17. The method of claim 13, further comprising:

receiving second SCI, wherein the second SCI is configured to indicate that the first terminal supports for being a collaborative terminal.

* * * * *